(12) United States Patent
Ogawa et al.

(10) Patent No.: US 6,496,463 B1
(45) Date of Patent: Dec. 17, 2002

(54) DISK APPARATUS

(75) Inventors: Toshihiro Ogawa, Iruma (JP); Changhao Gui, Iruma (JP); Yoshiki Kirinoe, Tokyo (JP)

(73) Assignee: Teac Corporation, Tokyo (JP)

( * ) Notice: Subject to any disclaimer, the term of this patent is extended or adjusted under 35 U.S.C. 154(b) by 0 days.

(21) Appl. No.: 09/582,423

(22) PCT Filed: Dec. 16, 1998

(86) PCT No.: PCT/JP98/05686

§ 371 (c)(1),
(2), (4) Date: Jun. 22, 2000

(87) PCT Pub. No.: WO99/34367

PCT Pub. Date: Jul. 8, 1999

(30) Foreign Application Priority Data

Dec. 24, 1997 (JP) .............................................. 9-355680
Dec. 24, 1997 (JP) .............................................. 9-355681

(51) Int. Cl.[7] .......................... G11B 17/04; G11B 25/04
(52) U.S. Cl. ............................................................ 369/75.2
(58) Field of Search .............................. 369/75.1, 75.2, 369/77.1, 77.2

(56) References Cited

U.S. PATENT DOCUMENTS

| 4,980,883 A | * | 12/1990 | Mutou et al. ............... 360/133 |
| 5,515,357 A | * | 5/1996 | Arata et al. .................. 369/191 |
| 5,691,969 A | | 11/1997 | Fujisawa |
| 5,699,338 A | * | 12/1997 | Leung ........................ 369/77.1 |
| 5,742,571 A | * | 4/1998 | Hoshino et al. .......... 369/30.95 |
| 6,229,781 B1 | * | 5/2001 | Fujisawa .................... 369/77.1 |

FOREIGN PATENT DOCUMENTS

| EP | 0 450 528 | 10/1991 |
| JP | 7-282512 | 10/1995 |

* cited by examiner

*Primary Examiner*—William Klimowicz
(74) *Attorney, Agent, or Firm*—Anderson Kill & Olick; Eugene Lieberstein; Michael N. Meller

(57) ABSTRACT

In a disk apparatus, a movable-base position sensing switch (169) is provided such that the sensing switch is turned from ON state into OFF state at a time a turntable (20) of a movable base (13) is separated from a clamper (16) during movement of the movable base (13) to an unclamped position. A motor (91) is controlled (190, 191, S12–S20) so that a driving force of the motor is used to move a tray and/or to move the movable base through a drive device. The motor is actuated in a first direction to move the movable base to the unclamped position for a first period from the time the position sensing switch is turned into OFF state. The motor is actuated in a reverse direction for a second period from an end of the first period. The driving of the motor is stopped for a third period from an end of the second period. The motor is actuated in the first direction from an end of the third period such that the tray is moved to the disk-change position.

6 Claims, 23 Drawing Sheets

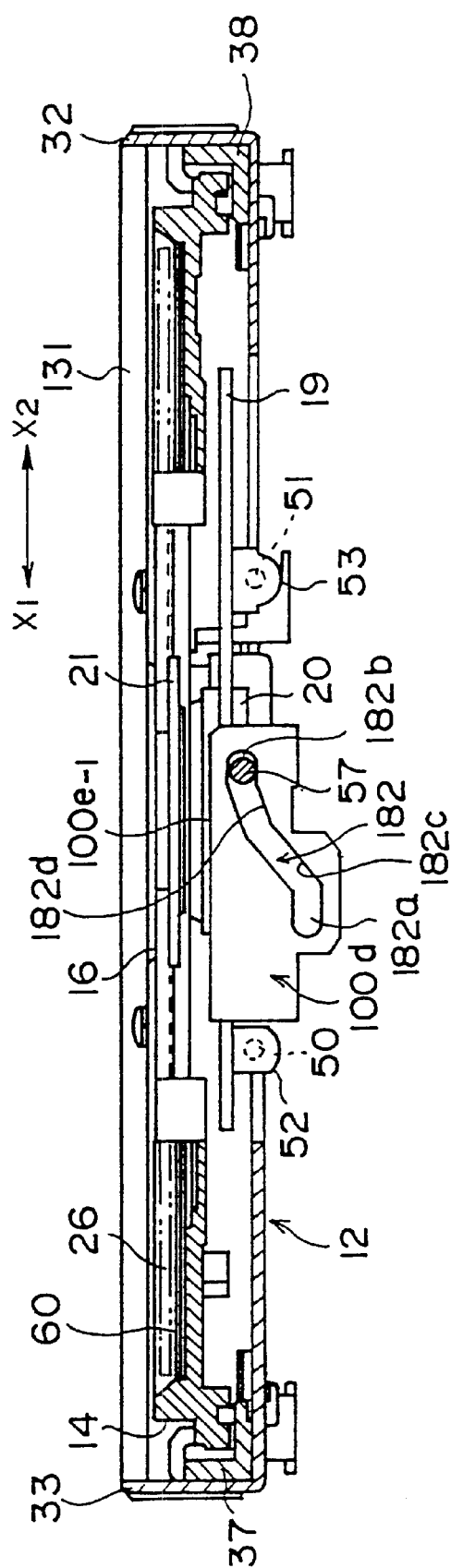
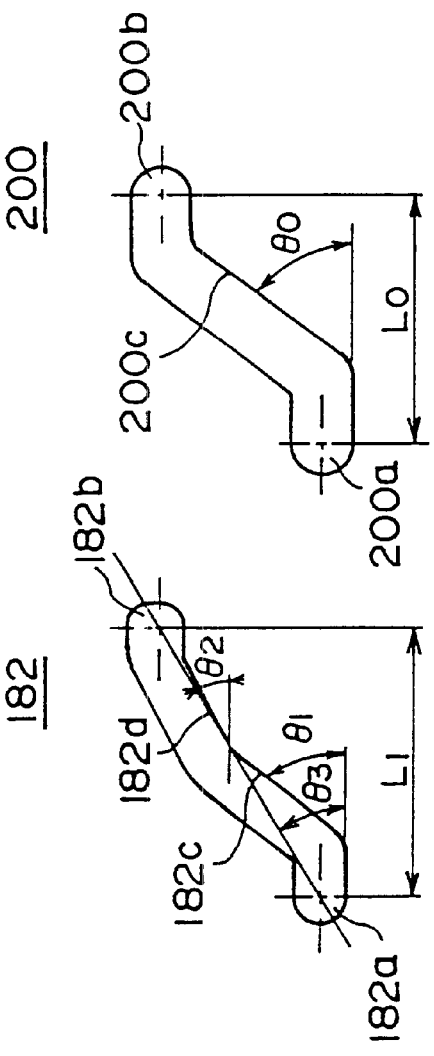
FIG. 4A
FIG. 4B
FIG. 4C PRIOR ART

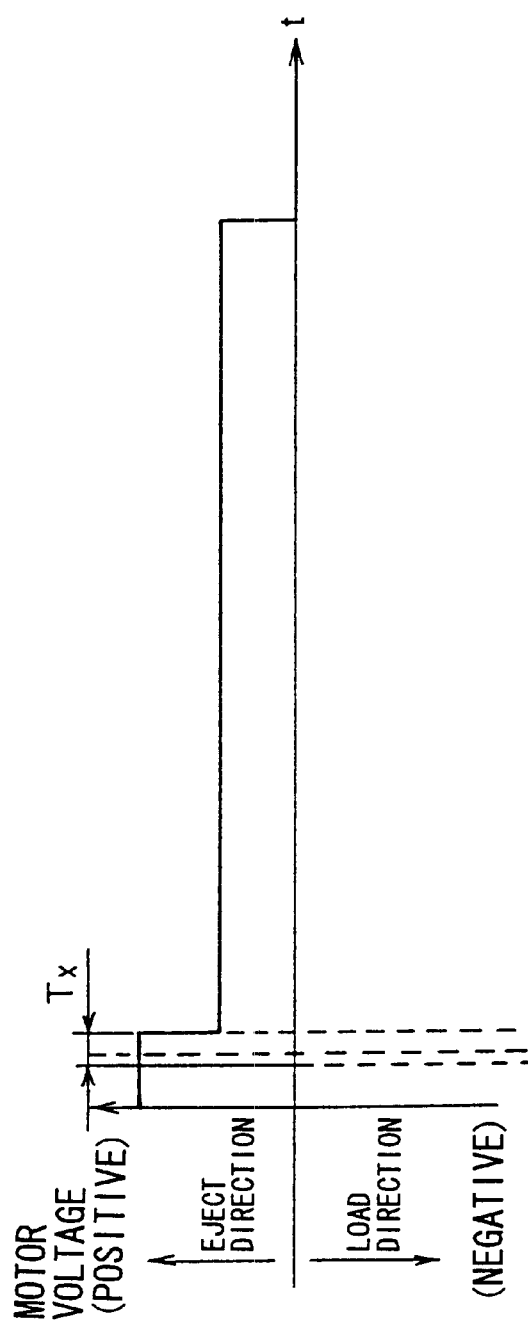
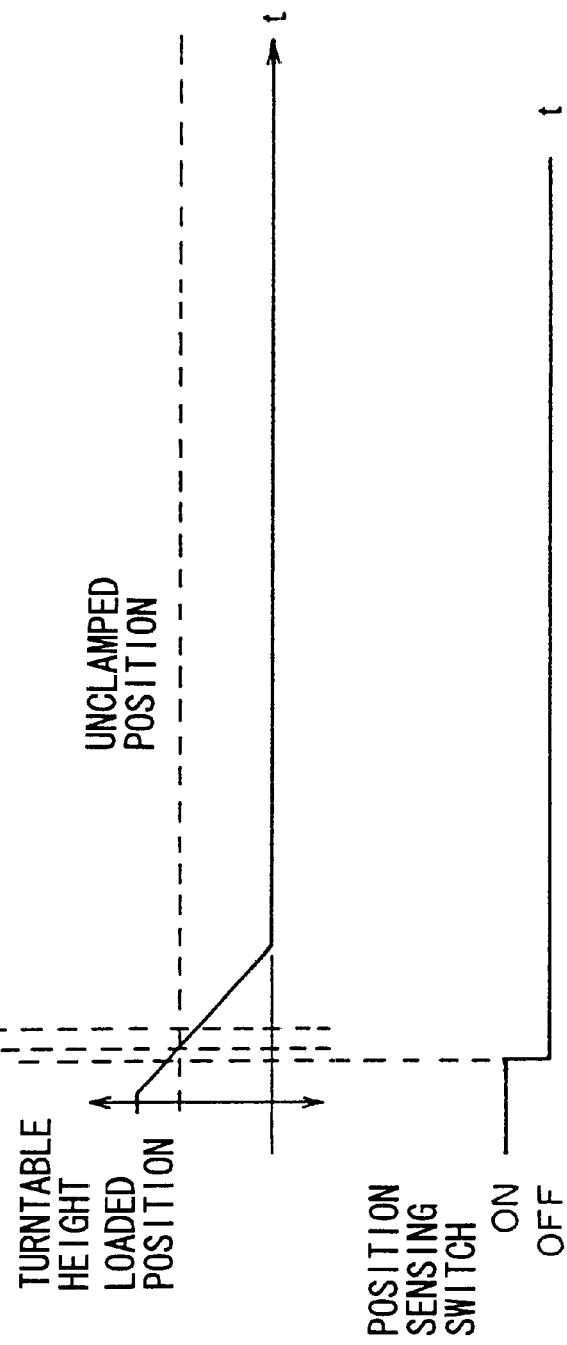
FIG. 23A PRIOR ART
FIG. 23B PRIOR ART
FIG. 23C PRIOR ART

DISK APPARATUS

BACKGROUND OF THE INVENTION

1. Field of the Invention

The present invention generally relates to a disk apparatus, and more particularly to a disk apparatus including a tray-type disk loading mechanism.

2. Description of the Related Art

Generally, the disk loading operation of a disk apparatus (for example, a CD-ROM drive) is divided into two major actions: (1) to insert the tray on which the disk is placed, into the main body of the disk apparatus, and (2) to set the disk, inserted in the main body, in a hold state in which the disk is held on the turntable of the disk apparatus (specifically, the disk is clamped between the turntable and the clamper). These actions are usually performed by using a driving force of a motor. In order to comply with a recent demand for smaller-size disk drive, several approaches to a disk loading mechanism that performs the two actions (1) and (2) by using a single motor have been proposed. A disk apparatus including the disk loading mechanism of this type is known from, for example, Japanese Laid-Open Patent Application No. 7-282512.

In the disk apparatus disclosed in Japanese Laid-Open Patent Application No. 7-282512, the disk loading mechanism is configured such that a single motor functions to insert the tray with the disk placed thereon, into the main body and to set the disk within the main body in the hold state in which the disk is clamped between the turntable and the clamper. In addition, in this disk apparatus, a movable base including the turntable and a spindle motor to rotate the disk on the turntable is provided. The movable base is raised or lowered with respect to the position of the tray by a drive device.

When the tray with the disk placed thereon is inserted into the main body, the movable base is raised by the drive device and the turntable is also raised together with the movable base. With the upward movement of the turntable, the disk is separated from the tray and placed on the turntable. As the movable base is further raised, the disk on the turntable is raised toward the clamper, which consequently sets the disk in the hold state in which the disk is held between the clamper and the turntable. These actions are called the disk loading operation of the disk apparatus.

On the other hand, when the disk is ejected from the disk apparatus, the movable base is lowered with respect to the position of the tray by the drive device. The turntable is also lowered together with the movable base. With the lowering movement of the turntable, the disk, held on the turntable, is separated from the clamper. As the movable base is further lowered, the disk is placed again on the tray. Following such actions, the tray is ejected from the main body of the disk apparatus and moved to a disk-change position where the disk on the tray can be taken out by the user. These actions are called the disk ejecting operation of the disk apparatus.

The above-mentioned disk loading mechanism has a structure that the movable base having the turntable provided thereon is raised or lowered. During the disk ejecting operation after an end of the reproducing process, there is a possibility that a faulty ejecting operation may take place with the disk loading mechanism. If the speed of lowering of the movable base by the drive device is too high, the ejection of the tray from the main body is started before the disk is placed at the right position of the tray.

If the tray is ejected from the main body with the disk not placed at the right position of the tray, the disk that is not firmly held on the tray may interfere with, for example, the front bezel (provided at the front end surface of the main body of the disk apparatus), which will damage the disk and/or the part of the disk apparatus. In cases of 8-cm CD-ROM drives, the faulty ejecting operation is more likely to occur.

Further, if a foreign matter sticks to the tray on which the disk is placed and the disk loading operation is performed with the above-mentioned disk loading mechanism, there is a possibility that a faulty loading operation may take place. After the disk loading operation is complete, the disk with the foreign matter attached thereto is clamped between the turntable and the clamper, and it is difficult for the disk loading mechanism to firmly hold the disk on the turntable. In such a case, the rotation of the disk on the turntable may not be maintained at an appropriate speed. Alternatively, a faulty operation may be performed such as an undesired lowering of the movable base. Further, if the speed of the tray being moved by the drive device is high, the disk may rattle within the tray during the movement.

Further, in the case of the disk loading mechanism having the structure that the movable base having the turntable provided thereon is raised or lowered, when the upward movement of the turntable makes the disk separated from the tray, the disk must be placed on the turntable with good positioning accuracy. If the positioning at that time is unsuitable, the disk is not placed at the right position of the turntable.

A conventional disk apparatus is configured with the tray having projections (or tray bosses) for preventing the unsuitable positioning during the disk loading operation. With the projections of the tray, the conventional disk apparatus is provided with the drive device (e.g., the slider provided for raising or lowering the movable base) having connecting portions. When the tray is moved to a predetermined position during the disk loading operation, the projections of the tray are connected to the connecting portions of the drive device. With the contact between the tray bosses and the connecting portions, the relative position between the tray and the turntable is maintained with good accuracy when placing the disk on the turntable.

However, the above conventional disk apparatus must be provided with the tray having the projections and the slider having the connecting portions, in order to maintain the relative position between the tray and the turntable with good accuracy. The tray and the slider are both moving parts that are moved during the disk loading operation of the disk apparatus, and the tray projections and the connecting portions are not always set at the predetermined position where they should be brought into contact with each other. Misalignment of the tray and the slider is highly possible. Hence, it is difficult for the above conventional disk apparatus to maintain the relative position between the tray and the turntable with good accuracy when placing the disk onto the turntable.

SUMMARY OF THE INVENTION

An object of the present invention is to provide an improved disk apparatus in which the above-described problems are eliminated.

Another object of the present invention is to provide a disk apparatus which can provide safe and reliable disk loading and ejecting operations of the disk loading mechanism.

Another object of the present invention is to provide a disk apparatus which can provide accurate positioning of the tray and the turntable when the disk is placed onto the turntable during the disk loading operation.

In order to achieve the above-mentioned objects, one preferred embodiment of the present invention provides a disk apparatus which includes a motor which provides a driving force, a tray which carries a disk from a disk-change position outside a main body of the disk apparatus to a disk-inserted position within the main body, the tray provided to be movable between the disk-change position and the disk-inserted position by using the driving force of the motor, a movable base which has a turntable for rotating the disk thereon and is provided to be movable relative to the tray between a clamping position where the disk on the turntable is held by a clamper and an unclamped position where the disk on the turntable is unclamped, and a drive device which moves up the movable base to the clamping position by using the driving force of the motor when the tray is at the disk-inserted position, and moves down the movable base from the clamping position to the unclamped position before the tray is moved toward the disk-change position, characterized in that the disk apparatus comprises: a movable-base position sensing switch which is turned from ON state into OFF state at a time the turntable of the movable base is separated from the clamper during the movement of the movable base to the unclamped position; and a control means for controlling the motor so that the driving force of the motor is used to move the tray and/or to move the movable base through the drive device, the control unit actuating the motor in a first direction to move the movable base to the unclamped position for a first period from the time the position sensing switch is turned into OFF state, actuating the motor in a reverse direction for a second period from an end of the first period, stopping the driving of the motor for a third period from an end of the second period, and actuating the motor in the first direction from an end of the third period such that the tray is moved to the disk-change position.

In the disk apparatus of the above preferred embodiment, the position sensing switch is turned from ON state into OFF state at the time the turntable of the movable base is separated from the clamper during the movement of the movable base to the unclamped position. It is possible to accurately detect the time the turntable is separated from the clamper during the disk ejecting operation.

Further, in the above preferred embodiment, the motor is actuated in the first direction to move the movable base to the unclamped position for the first period from the time the position sensing switch is turned into OFF state. As the movable base is lowered from the position of the tray, and the disk on the turntable is moved so as to be placed on the tray.

Further, in the above preferred embodiment, the motor is actuated in the reverse direction for the second period from the end of the first period. The speed of the movement of the movable base in the direction away from the tray is decreased at this time. The driving of the motor is stopped for the third period from the end of the second period. At this time, the braking force of the motor acts on the movable base so as to slowly place the disk onto the tray. The motor is then actuated in the first direction from the end of the third period such that the tray is moved to the disk-change position. The rattling of the disk within the tray during the movement can be avoided. Hence, the disk apparatus of the above preferred embodiment is effective in carrying out safe and reliable disk ejecting operation of the disk loading mechanism.

Further, in order to achieve the above-mentioned objects, another preferred embodiment of the present invention provides a disk apparatus which includes a motor which provides a driving force, a tray which carries a disk from a disk-change position outside a main body of the disk apparatus to a disk-inserted position within the main body, the tray provided to be movable between the disk-change position and the disk-inserted position by using the driving force of the motor, a movable base which has a turntable for rotating the disk thereon and is provided to be movable relative to the tray between a clamping position where the disk on the turntable is held by a clamper and an unclamped position where the disk on the turntable is unclamped, and a drive device which moves up the movable base to the clamping position by using the driving force of the motor when the tray is at the disk-inserted position, and moves down the movable base from the clamping position to the unclamped position before the tray is moved toward the disk-change position, characterized in that the disk apparatus comprises: a movable-base position sensing switch which is turned from OFF state into ON state at a time the movable base is moved to reach a predetermined position during the movement of the movable base to the clamping position; and a control means for controlling the motor so that the driving force of the motor is selectively used to move the tray or to move the movable base through the drive device, the control unit actuating the motor in a first direction to move the movable base to the clamping position for a first period from the time the position sensing switch is turned into ON state, actuating the motor in a reverse direction for a second period from an end of the first period, and actuating the motor in the first direction when the position sensing switch is turned into OFF state during the second period, such that the tray is moved to the disk-change position.

In the disk apparatus of the above preferred embodiment, the motor is actuated in the first direction to move the movable base to the clamping position for the first period from the time the position sensing switch is turned into ON state. The motor is actuated in the reverse direction for the second period from the end of the first period. The motor is actuated in the first direction when the position sensing switch is turned into OFF state during the second period, such that the tray is moved to the disk-change position.

Even when a foreign matter sticks to the tray on which the disk is placed and the disk loading operation is performed, it is possible to safely avoid the occurrence of a faulty disk loading operation. By using the position sensing switch, it is detected whether the foreign matter is present. If the presence of the foreign matter is detected, the control means functions to disconnect the turntable from the clamper during the disk loading operation.

Further, in the above preferred embodiment, the motor is actuated in the reverse direction for the second period from the end of the first period. The speed of the movement of the movable base is decreased at this time, and the braking force of the motor acts on the movable base. Hence, the disk apparatus of the above preferred embodiment is effective in carrying out safe and reliable disk loading operation of the disk loading mechanism.

Further, according to another preferred embodiment of the present invention, a disk apparatus includes a tray which carries a disk from a disk-change position outside a main body of the disk apparatus to a disk-inserted position within the main body, the tray provided to be movable between the disk-change position and the disk-inserted position, and a movable base which has a spindle motor and a turntable for rotating the disk and is provided to be movable relative to the tray between a raised position and a lowered position, the movable base being moved, when the tray is at the disk-inserted position, to a connection position where the turntable on the movable base is connected to the disk on the tray, characterized in that the disk apparatus comprises a first positioning portion provided on the movable base, and a second positioning portion provided on the tray, and that the first and second positioning portions are configured to be connected to each other when the tray is located at the disk-inserted position and the movable base is located at the connection position, and the tray is positioned with respect to the position of the movable base by the connection of the first and second positioning portions.

In the disk apparatus of the above preferred embodiment, the first positioning portion is provided on the movable base, and the second positioning portion is provided on the tray. The first positioning portion and the second positioning portion are connected to each other when the tray is located at the disk-inserted position and the movable base is located at the connection position. The spindle motor and the turntable for rotating the disk are provided on the movable base. The tray is positioned with respect to the position of the movable base by the connection of the first and second positioning portions. The disk apparatus of the above preferred embodiment is effective in providing accurate positioning of the tray and the turntable when the disk is placed onto the turntable during the disk loading operation.

BRIEF DESCRIPTION OF THE DRAWINGS

Other objects, features and advantages of the present invention will become apparent from the following detailed description when read in conjunction with the accompanying drawings.

FIG. 4A is a cross-sectional view of the CD-ROM apparatus taken along a line IV—IV indicated in FIG. 1.

FIG. 4B is a diagram showing a cam groove of the CD-ROM apparatus of FIG. 4A.

FIG. 4C is a diagram showing a cam groove of a conventional disk apparatus.

FIG. 23A, FIG. 23B and FIG. 23C are time charts for explaining a disk ejecting operation of a conventional disk apparatus.

DETAILED DESCRIPTION OF PREFERRED EMBODIMENTS

Figure 1:
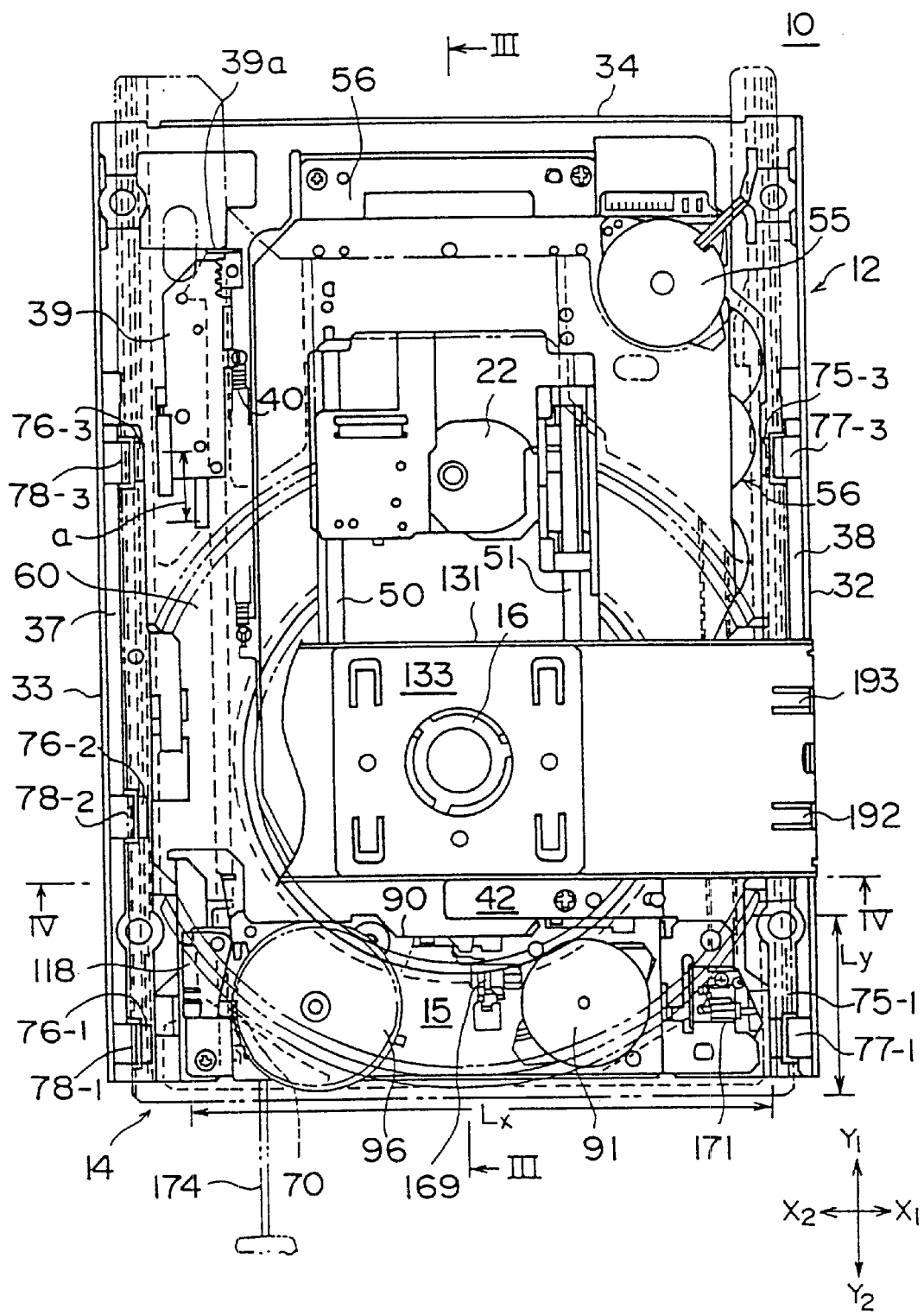
FIG. 1 is a top view of a CD-ROM apparatus (wherein the tray is omitted) to which one preferred embodiment of the invention is applied.

A description will now be provided of preferred embodiments of the present invention with reference to the accompanying drawings.

FIG. 1 through FIG. 16 show one preferred embodiment of the disk apparatus of the present invention. A description will be provided of the general structure and operations of the disk apparatus of the present embodiment. In the following description, a CD-ROM apparatus 10 is provided as an example of the disk apparatus of the invention.

As shown in FIG. 1 through FIG. 7, the CD-ROM apparatus 10 generally includes a chassis 11, a base 12, a movable base 13, a tray 14, a loading drive device 15, a clamper 16, and a front bezel 17. The base 12 is attached to the chassis 11. The movable base 13 is attached to the base 12. The tray 14 is supported on the base 12. The loading drive device 15 is attached to the base 12. The clamper 16 is supported on the base 12. The front bezel 17 is attached to a front end of the chassis 11. The CD-ROM apparatus 10 further includes a cover plate (not shown) which covers the top of the CD-ROM apparatus.

The movable base 13 is comprised of a movable base body 19, a turntable 20, a turntable motor 21, an optical head 22, and an optical-head moving device 23. The turntable 20, the turntable motor 21, the optical head 22, and the optical-head moving device 23 are attached to the movable base body 19. The turntable motor 21 functions to rotate the turntable 20. The optical-head moving device 23 functions to move the optical head 22.

Figure 8A:
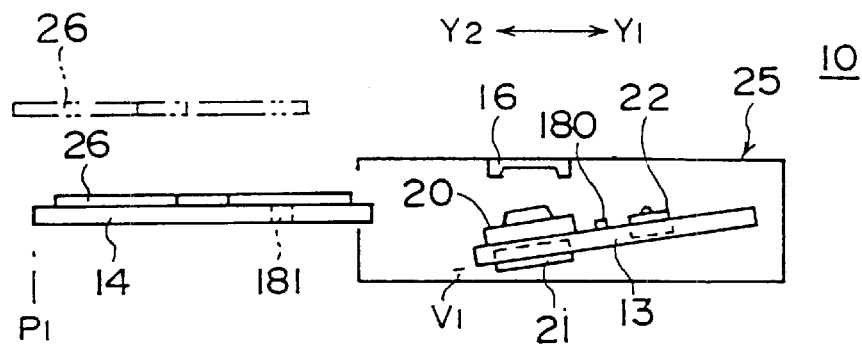
FIG. 8A, FIG. 8B, FIG. 8C and FIG. 8D are diagrams for explaining a disk loading operation of the CD-ROM apparatus of FIG. 1.

Before a CD-ROM 26 is inserted, the CD-ROM apparatus 10 is set in a condition shown in FIG. 8A. In this condition, the tray 14 is moved in a direction, indicated by the arrow Y₂ in FIG. 8A, to a disk-change position that is located outside the main body 25 of the CD-ROM apparatus. In this condition, the movable base 13 is lowered from the position of the tray 14, and set in a slanted condition (or an unclamped position), facing the downward direction.

Figure 5:
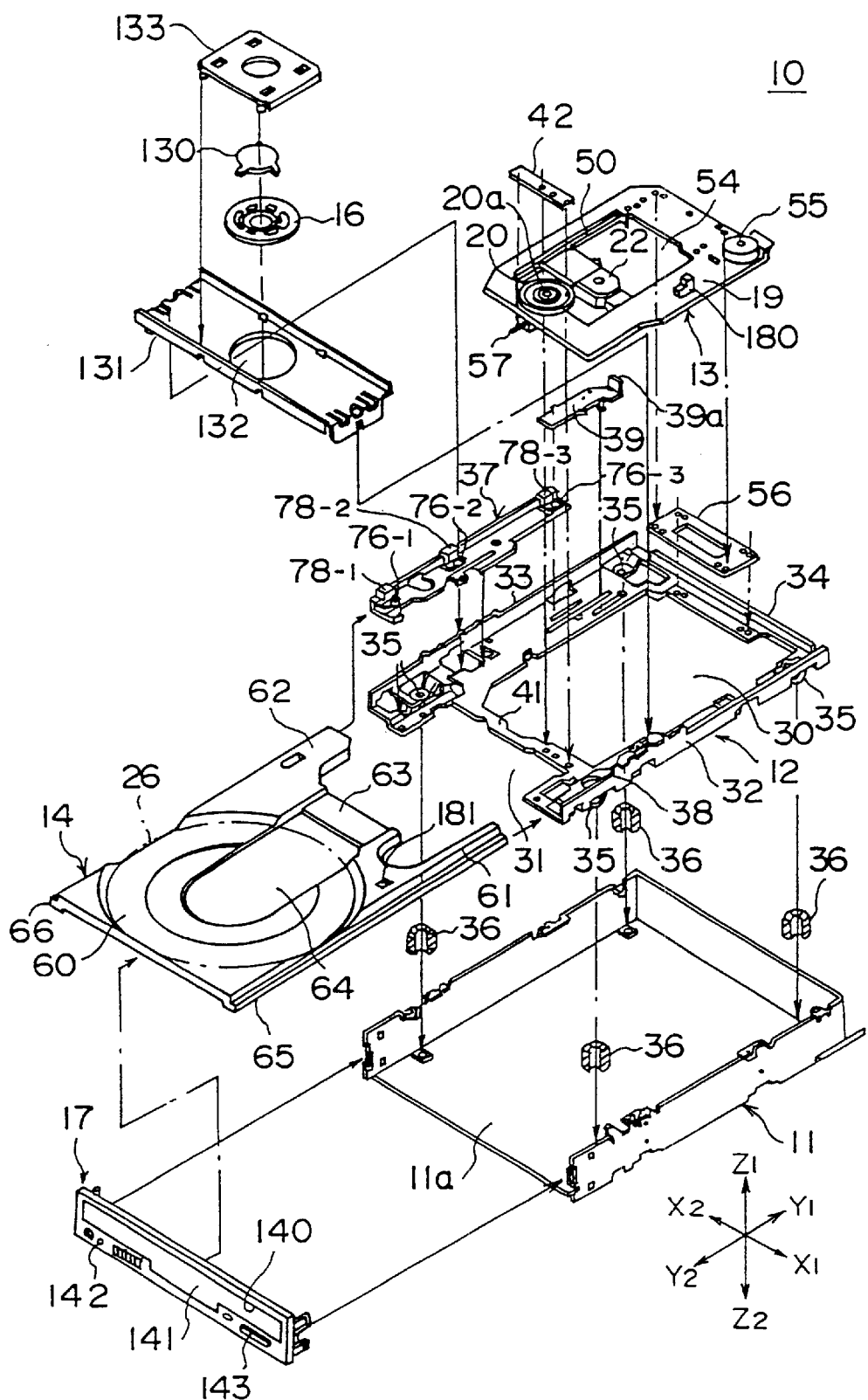
FIG. 5 is an exploded view of the CD-ROM apparatus of FIG. 1 in which a loading drive device is omitted.
Figure 6:
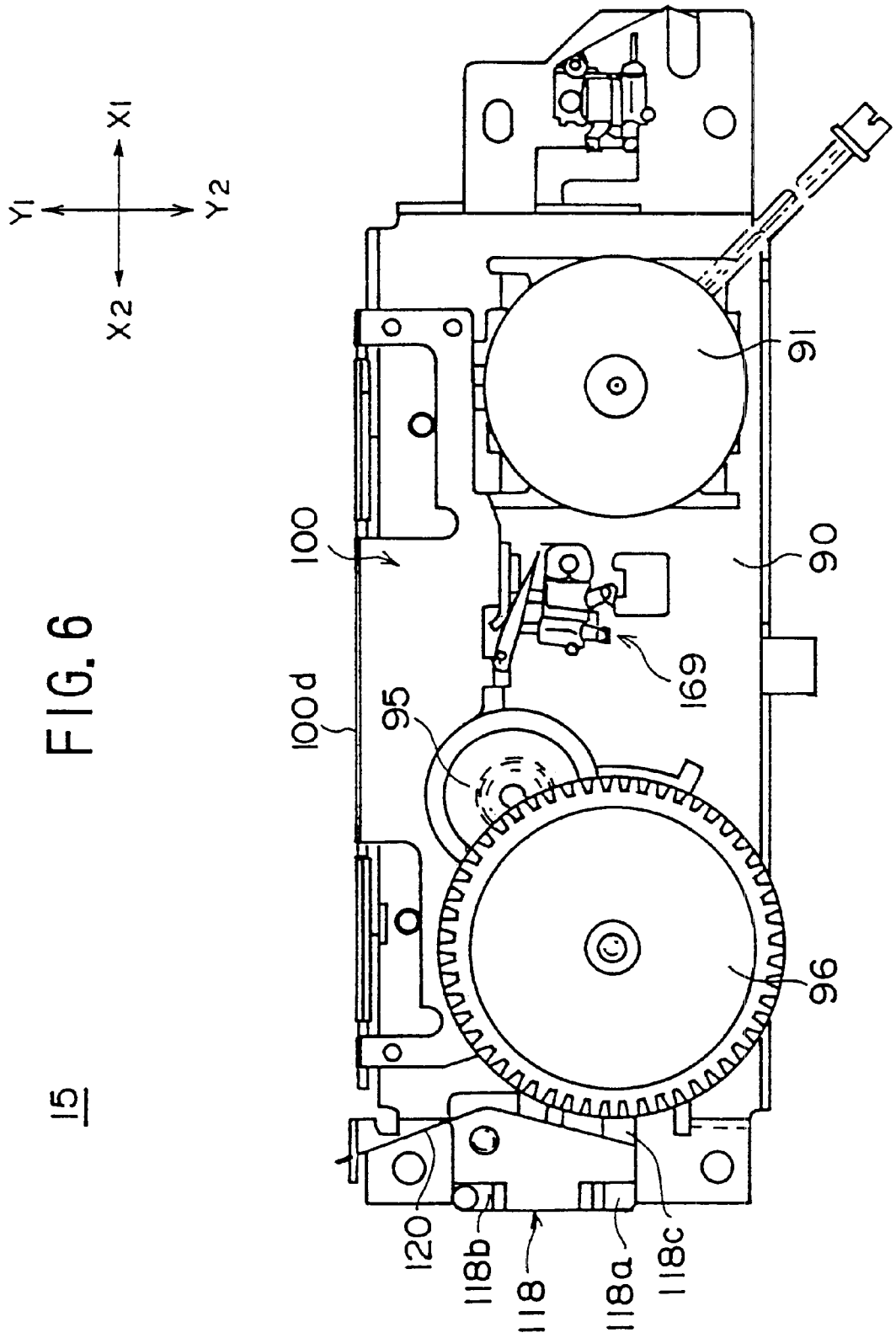
FIG. 6 is a top view of the loading drive device in the CD-ROM apparatus of FIG. 1.

When the CD-ROM 26 is loaded into the CD-ROM apparatus 10, the operator places the CD-ROM 26 on the tray 14 and depresses a control button 143 (see FIG. 5). Alternatively, the operator may perform a manual operation to push the tray 14 toward the CD-ROM apparatus 10. In response to this action, the loading drive device 15 starts performing its two operations: (1) to move the tray 14 in the direction Y1 from the disk-change position to a disk-inserted position, and (2) to upwardly rotate the movable base 13 from the slanted position to the horizontal position (or a clamping position).

Figure 8B:
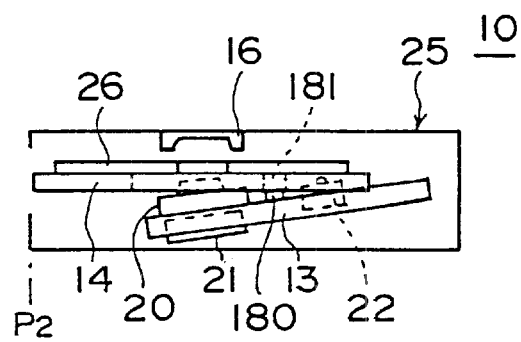
Figure 8C:
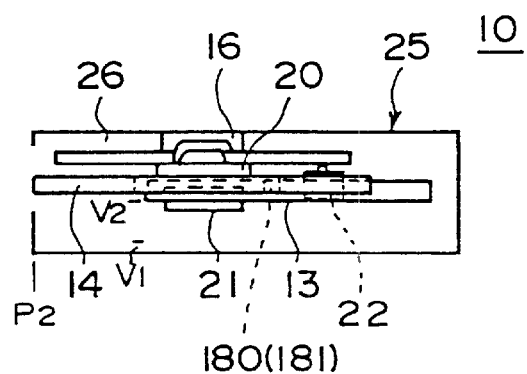
Figure 8D:
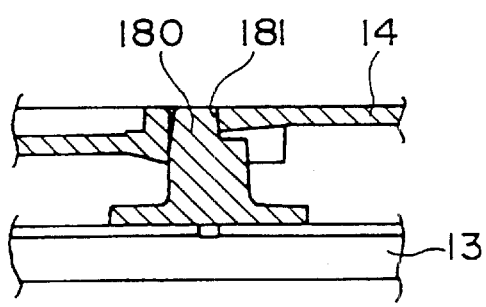

After the above operation (1) is performed, the CD-ROM 26 is inserted into the main body 25 of the CD-ROM apparatus as shown in FIG. 8B. After the above operation (2) is performed, the CD-ROM 26, inserted in the main body 25, is separated from the tray 14 and held on the turntable 20 as shown in FIG. 8C. The CD-ROM 26 on the turntable 20 is clamped by the clamper 16, and it is ready for reproducing information from the CD-ROM 26 on the CD-ROM apparatus 10.

Next, a description will be provided of the structure of the disk apparatus used for the disk loading operation and the reproducing process. First, the structure of the base 12 will be explained.

As shown in FIG. 1 through FIG. 5, the base 12 is formed into a frame-like member having a generally rectangular shape. The base 12 includes a movable-base mounting portion 30 which is provided as a generally rectangular opening. On the front side (the end in the direction Y2) of the base 12, a loading-drive-device mounting portion 31 is provided as a cut-out portion. The base 12 includes raised walls 32 and 33 on the right and left sides (the ends in the directions X1 and X2) of the base 12.

Further, the base 12 includes four legs 35 at the respective corners of the bottom of the base 12, and the legs 35 are respectively attached to the chassis 11 via insulators 36. The chassis 11 is a box-like member having a bottom plate 11a. The base 12 is accommodated in the chassis 11 such that the legs 35 of the base 12 are slightly lifted from the bottom plate 11a of the chassis 11 by the use of the insulators 36 between the base 12 and the chassis 11.

Further, a pair of tray guide members 37 and 38 are attached to the left and right sides (the ends in the directions X2 and X1) of the base 12, and a tray pushing plate 39 is attached to the left side (the end in the direction X2) of the base 12. The tray pushing plate 39 is provided on the base 12 such that the tray pushing plate 39 is movable in one of the directions Y1 and Y2. A spring 40 exerts an actuating force on the tray pushing plate 39 so as to pull the tray pushing plate 39 in the direction Y2.

Next, a description will be provided of the structure of the movable base 13.

As shown in FIG. 1 through FIG. 5, the movable base 13 includes a movable base body 19 having a generally rectangular shape. The turntable motor 21 is attached to the end (the end in the direction Y2) of the movable base body 19. The turntable 20 is fixed to the spindle of the turntable motor 21.

The turntable 20 is located at an upper portion (in the direction Z1) on the movable base body 19. The turntable 20 contains a magnet 20a which exerts a magnetic attracting force on the clamper 16 so as to hold the CD-ROM 26 between the turntable 20 and the clamper 16. Further, an upwardly extending positioning projection 181 is provided on the top of the movable base body 19 (see FIG. 5). A pair of guide shafts 50 and 51 are provided on the bottom of the movable base body 19. The guide shafts 50 and 51 are extending in the directions Y1 and Y2 and arranged in parallel to each other. The guide shafts 50 and 51 are held at their ends on the movable base body 19 by a pair of holding portions 52 and 53.

The optical head 22 is supported at its ends on the movable base 13 by the guide shafts 50 and 51. The optical head 22 is provided such that the optical head 22 is movable within an opening 54 of the movable base body 19 in one of the directions Y1 and Y2. The head moving device 23 is provided on the movable base body 19, and the head moving device 23 includes a motor 55 and a gear device 56 which is driven by the motor 55.

In the above-described movable base 13, the rear end (or the end in the direction Y1) of the movable base body 19 is attached to the base 12 by using a leaf spring member 56. The movable base 23 is arranged in the movable-base mounting portion 30 of the base 12. As the leaf spring member 56 deflects, the movable base 13 is vertically rotatable around the rear end thereof in one of the directions A and B indicated in FIG. 3. Further, a pin (or a driven pin) 57 is provided in the center on the front end (the end in the direction Y2) of the movable base body 19 such that the pin 57 projects from the movable base body 19 in the direction Y2. The pin 57 is configured such that it can be brought into contact with a leaf spring member 42 attached to a bar 41 which is provided in the vicinity of the front end (the end in the direction Y2) of the base 12, which will be described later.

Next, a description will be provided of the tray 14. The tray 14 generally includes, as shown in FIG. 5, a CD-ROM placing portion 60, a pair of arm portions 61 and 62, a bar portion 63, an opening 64, and a positioning opening 181. The CD-ROM placing portion 60 is formed into a dish-like member, and the CD-ROM 26 is placed on the CD-ROM placing portion 60. The arm portions 61 and 62 are provided at rear ends of the tray 14 and extend from the rear ends in the direction Y1. The bar portion 63 extends transversely and interconnects the arm portions 61 and 62. The turntable 20 and the optical head 22, which are provided on the movable base 13, are fitted into the opening 64 of the tray 14. The positioning opening is provided in the surface of the tray 14 for positioning of the tray 14 with high accuracy with respect to the turntable 20 of the movable base 13.

Figure 9:
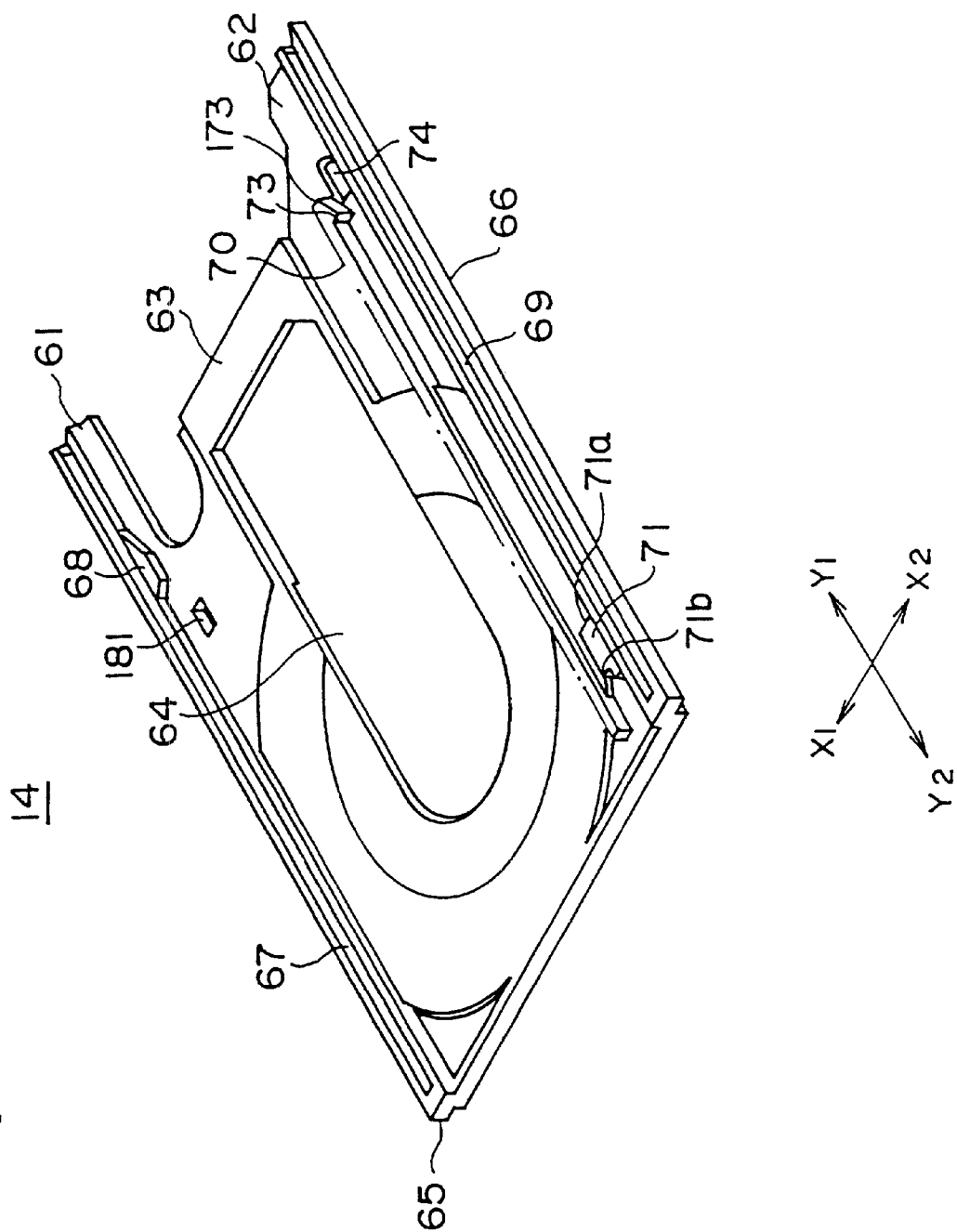
FIG. 9 is a perspective view of a tray of the CD-ROM apparatus of FIG. 1 which is inverted up side down.

Further, the side portions (the ends in the directions X1 and X2) of the tray 14 are formed into step portions 65 and 66 which are provided slightly below the top of the tray 14. The step portions 65 and 66 are, as shown in FIG. 9, provided with a guide groove 67 and a projection 68. The step portion 66 (the side end of the bottom of the tray 14 in the direction X2) is provided with a guide groove 69, a rack 70 (having a gear-toothed surface), a projection 71, a contact surface portion 71a, a contact surface portion 71b, a connecting portion 73, etc. Further, an opening 74 is provided in the vicinity of the connecting portion 73 at the end of the bottom of the arm portion 62.

Figure 2:
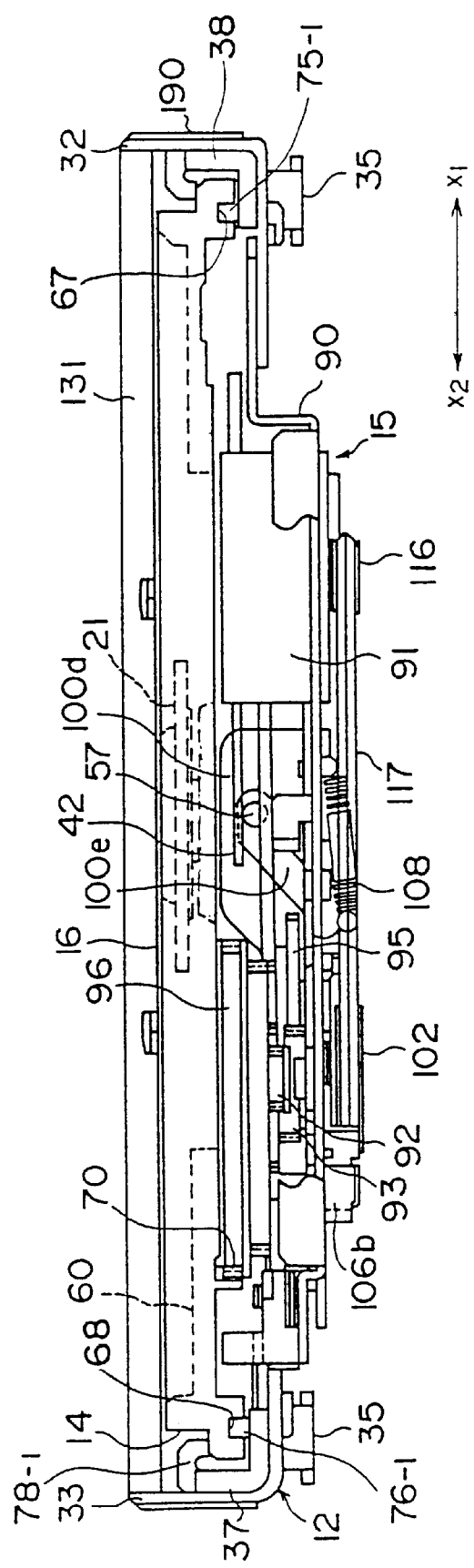
FIG. 2 is a front view of the CD-ROM apparatus of FIG. 1 wherein the front bezel is omitted.
Figure 3:
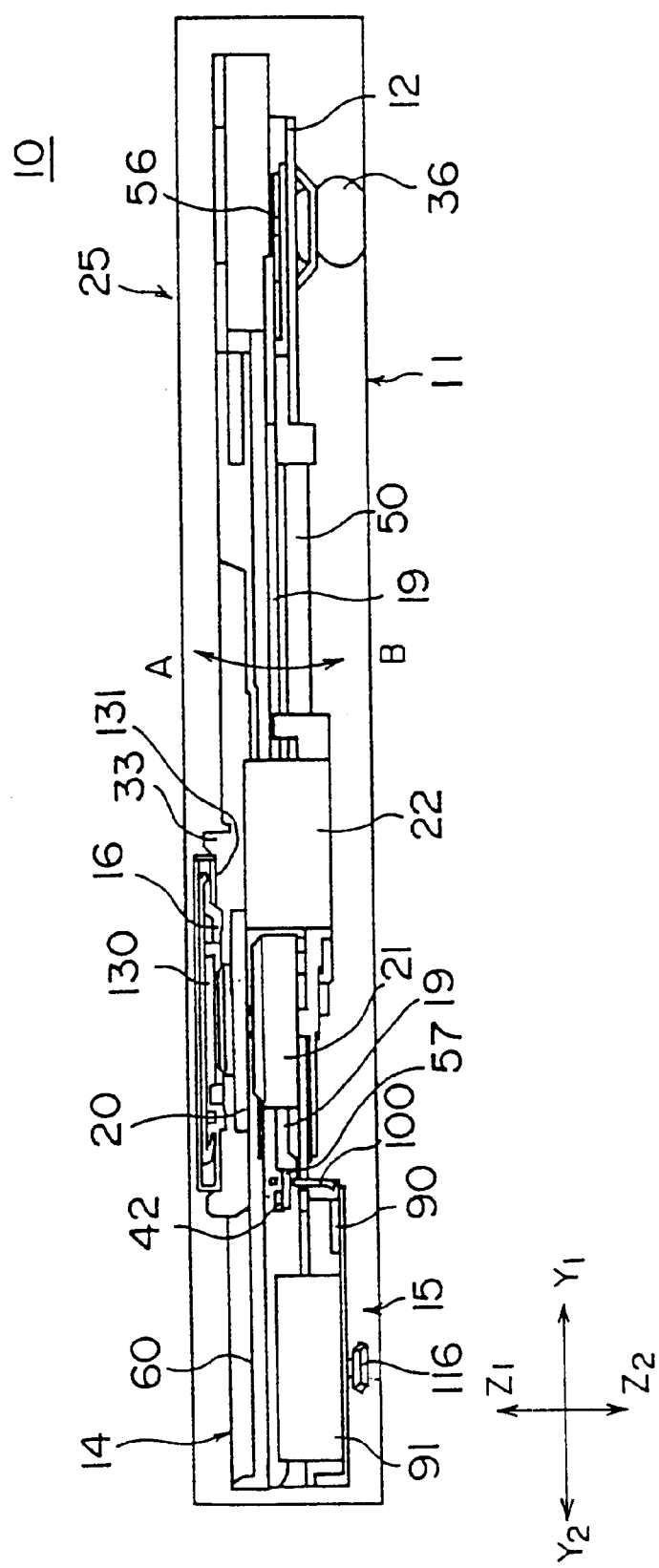
FIG. 3 is a cross-sectional view of the CD-ROM apparatus taken along a line III—III indicated in FIG. 1.

As shown in FIG. 1 and FIG. 2, the guide groove 67 in the above-described tray 14 is fitted to three projecting portions 75-1 through 75-3 of the tray guide member 38, and the guide groove 68 is fitted to three projecting portions 76-1 through 76-3 of the tray guide member 39. The step portion 65 is fitted to three holding arms 77-1 through 77-3 of the tray guide member 38, and the step portion 66 is fitted to three holding arms 78-1 through 78-3 of the tray guide member 37. The tray 14 is arranged in this manner such that the tray 14 is movable relative to the main body 25 of the disk apparatus in one of the directions Y1 and Y2.

Specifically, the tray 14 is provided on the disk apparatus such that the tray 14 is movable relative to the main body 25 between a disk-change position P1 (indicated in FIG. 8A) and a disk-inserted position P2 (indicated in FIG. 8B, FIG. 8C, FIG. 1 and FIG. 2). When the tray 14 is at the disk-change position P1, the CD-ROM 26 is placed on or removed from the tray 14. When the tray 14 is at the disk-inserted position P2, the CD-ROM 26 is loaded into the main body 25. The rack 70 of the tray 14 is engaged with a gear 96 (which will be described later), and the gear 96 is rotated by a driving device so as to move the tray 14 relative to the main body 25 through the engagement of the rack 70 and the gear 96.

Next, a description will be given of the loading drive device 15. The loading drive device 15 will also be referred to as the loading drive assembly 15.

As shown in FIG. 6, FIG. 7, FIG. 1 and FIG. 2, the loading drive device 15 generally has a base plate 90 on which the elements of the loading drive device 15 are supported. A loading motor 91 (which is the driving device for the tray 14 and the movable base 13) is attached to the left side portion (the end in the direction X1) of the base plate 90, and a plurality of gears 92 through 96 and a rotation base 97 are attached to the right side portion (the end in the direction X2) of the base plate 90. Further, a slider 100 (which is a movable-base moving device for moving the movable base 13) is attached to the front end portion (the end in the direction Y1) of the base plate 90.

The plurality of gears 92 through 96 form a reduction gear device. Each of the gears 93 and 95 has two gear wheels that are coaxially arranged. The gear 96 is a final-stage gear of the reduction gear device, and the gear 96 is engaged with the rack 70 of the tray 14. Further, a pin 101 is embedded onto the top of the base plate 90 such that the pin 101 upwardly projects from the top of the base plate 90. The gear 93 and the gear 96 are rotatably supported on the pin 101 of the base plate 90.

Further, in the loading drive device 15, a shaft 103 is fixed to a pulley 102, and a collar member 104 is fitted to the shaft 103 such that the collar member 104 is rotatable around the central axis of the shaft 103. The gear 92 is fixed to the upper portion of the shaft 103. A slot opening 105 is provided in the base plate 90, and the collar member 104 is arranged such that the collar member 104 is located within the opening 105. The opening 105 is formed in the base plate 90 such that the opening 105 extends in the direction away from the pin 101. Further, a circular opening 105a is provided in the base plate 90 such that the opening 105a merges into the end of the opening 105.

Further, in the loading drive device 15, an emergency arm 106 is provided. A pin 107 is embedded onto the bottom of the base plate 105 such that the pin 107 downwardly projects from the bottom of the base plate 105. The emergency arm 106 is fitted to the pin 107 such that the emergency arm 106 is rotatable around the central axis of the pin 107. A spring 108 (shown in FIG. 2) is provided on the loading drive device 15, and the spring 108 exerts an actuating force on the emergency arm 106 so as to rotate the emergency arm 106 counterclockwise around the central axis of the pin 107. The emergency arm 106 includes a U-shaped cut-out portion 106a, and the collar member 104 includes a ring-like groove 104a on the outer peripheral edge of the collar member 104. The lower portion of the ring-like groove 104a of the collar member 104 is fitted to the inner peripheral edge of the cut-out portion 106a of the emergency arm 106.

The collar member 104 is normally pressed by the emergency arm 106 so that the collar member 104 is located at a fixed position Q1 (indicated in FIG. 7) of the opening 105. The groove 104a of the collar member 104 is fitted to the opening 105. This arrangement makes the gear 92 engaged with the gear 93.

The rotation base 97 has an opening 97a, and the pin 101 is inserted into the opening 97a of the rotation base 97. The rotation base 97 includes a locking portion 97a, and the locking portion 97b is fitted to a circular slit 109 of the base plate 90. The rotation base 97 has a circular slit 97c, and a raised lug 110 of the base plate 90 is fitted to the circular slit 97c. Thus, the rotation base 97 is rotatably supported on the base plate 90, while the lifting of the rotation base 97 from the base plate 90 is restricted. The rotation base 97 includes a hole 97a and a gear portion 97d, and the gear portion 97d is formed along the circular peripheral centered on the hole 97a. A pin 111 is embedded onto the top of the rotation base 97, and the gear 94 is fitted to the pin 111 so that the gear 94 is rotatably supported on the pin 111. A pin 112 is also embedded onto the top of the rotation base 97, and the gear 95 is fitted to the pin 112 so that the gear 95 is rotatably supported on the pin 112.

The gear 95 is engaged with both the gear 94 and the gear 96. The gear 94 is engaged with the gear 93. A pair of arm guide mounting portions 97e are provided as raised projections on the rotation base 97. An arm guide 113 is attached to the arm guide mounting portions 97e of the rotation base 97.

Figure 7:
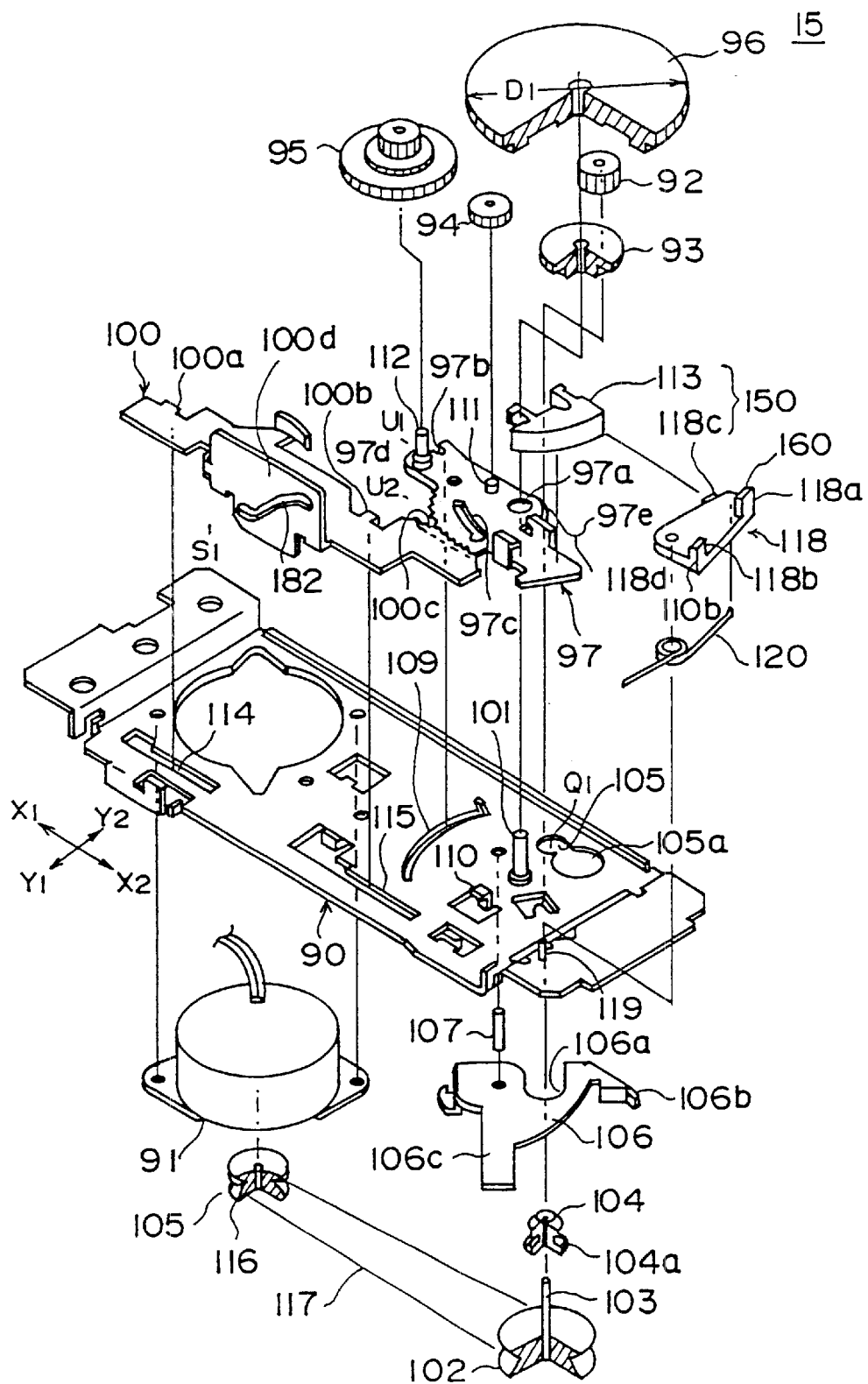
FIG. 7 is an exploded view of the loading drive device of FIG. 6.

The slider 100 generally includes, as shown in FIG. 7, a pair of locking portions 100a and 100b. The locking portions 100a and 100b are fitted to slits 114 and 115 of the base plate 90. The slider 100 is arranged on the base plate 90 such that the slider 100 is movably supported on the base plate 90 in one of the directions X1 and X2. Further, the slider 100 includes a rack portion 100c, and the rack portion 100c is engaged with the gear portion 97b. The slider 100 further includes a raised wall portion 100d, and the raised wall portion 100d includes a cam groove 182 provided therein.

As shown in FIG. 4A and FIG. 4B, the cam groove 182 of the slider 100 includes a start-point portion 182a, an end-point portion 182b, a first slanted groove 182c, and a second slanted portion 182d. The start-point portion 182a is provided at the lower end of the cam groove 182 and extends in the horizontal direction. The end-point portion 182b is provided at the upper end of the cam groove 182 and extends in the horizontal direction. The first slanted groove 182c and the second slanted portion 182d are provided between the start-point portion 182a and the end-point portion 182b, and the grooves 182c and 182d have different inclination angles θ1 and θ2 with respect to the horizontal direction, respectively.

FIG. 4B shows the details of the cam groove 182 of the slider 100 in the present embodiment. FIG. 4C shows the details of a cam groove 200 of a slider in a conventional disk apparatus. As shown in FIG. 4C, in the slider of the conventional disk apparatus, the cam groove 200 includes a start-point portion 200a, an end-point portion 200b, and a slanted groove 200c. The start-point portion 200a is provided at the lower end of the cam groove 200 and extends in the horizontal direction. The end-point portion 200b is provided at the upper end of the cam groove 200 and extends in the horizontal direction. The slanted groove 200c is provided between the start-point portion 200a and the end-point portion 200b, and the groove 200c has a single inclination angle θ0 with respect to the horizontal direction.

A description will now be provided of the differences between the cam groove 182 and the cam groove 200. The cam groove 182 in the present embodiment has a horizontal length L1 (the distance from the start-point portion 182a to the end-point portion 182b along the direction X1 or X2) that is larger than a horizontal length L0 of the cam groove 200 in the conventional disk apparatus (L1>L0). Both the inclination angles θ1 and θ2 of the cam groove 182 are smaller than the inclination angle θ0 of the cam groove 200 (θ1<θ0, θ2<θ0).

Figure 16:
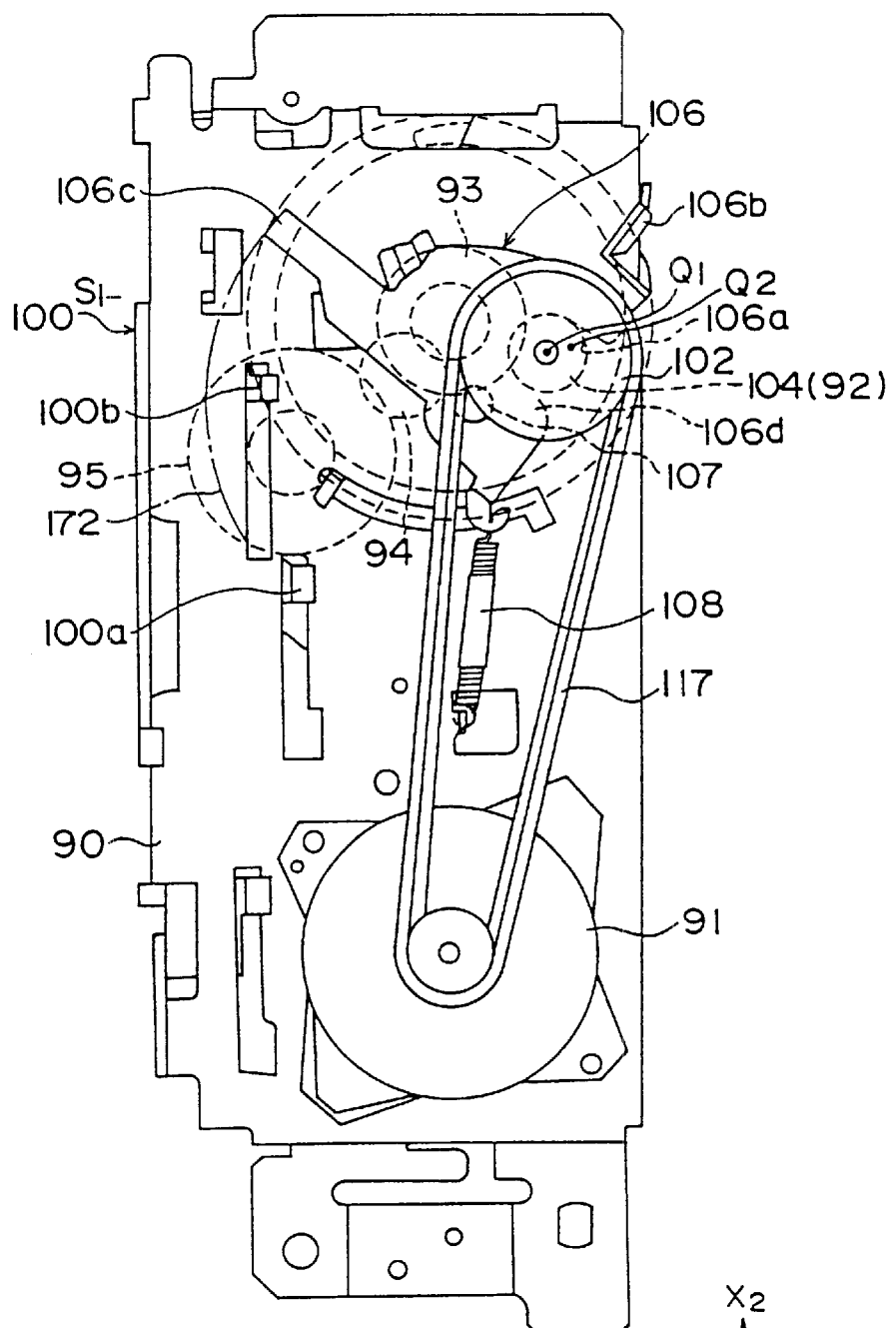
FIG. 16 is a bottom view of the loading drive device.

FIG. 16 is a bottom view of the loading drive device 15 in the present embodiment. As shown in FIG. 7 and FIG. 16, on the bottom surface of the base plate 90, a belt 117 is wound on the pulley 116 of the loading motor 91 and on the pulley 102 of the loading drive device 15. A tray locking arm 118 is provided on the right end portion (the end in the direction X2) of the base plate 90.

The tray locking arm 118 includes a pair of locking projections 118a and 118b, a locking projection 118c, and a hole 118d. A pin 119 is embedded onto the base plate 90. The hole 118d of the tray locking arm 118 is fitted to the pin 119, and the tray locking arm 118 is attached to the base plate 90. Further, a torsion spring 120 is provided on the base plate 90, and the spring 120 exerts an actuating force on the tray locking arm 118 so as to rotate the tray locking arm 118 counterclockwise around the central axis of the pin 119.

In the above-described loading drive device 15, as shown in FIG. 1 and FIG. 2, the base plate 90 is fastened at its ends to the base 12 by using screws. As shown in FIG. 5, the loading drive device 15 is mounted on the base 12 so that the loading drive device 15 is fitted to the loading-drive-device mounting portion 31 of the base 12. When the loading drive device 15 is in the mounted condition, the gear 96 is engaged with the rack 70 and the pin 57 is fitted into the cam groove 182.

The clamper 16 has a circular iron plate 130 on the top of the clamper 16 as shown in FIG. 1 through FIG. 3 and FIG. 5. A clamper holder 131 includes an opening 132 in the center of the clamper holder 131. The clamper 16 is provided within the opening 132 of the clamper holder 131, and held by a clamper stopper 133. The clamper stopper 133 is fixed to the clamper holder 131. The clamper holder 131 is a rectangular member, and the clamper holder 131 is attached to the base 12 by supporting the clamper holder 131 on the raised walls 32 and 33.

The front bezel 17 is fixed to the front end of the chassis 11. As shown in FIG. 5, the front bezel 17 generally includes an opening 140, a lid 141 for closing the opening 140, an emergency hole 142, and a control button 143. The locking projection 118c of the tray locking arm 118 and the arm guide 113 serve as a rotation base locking device 150 which locks the rotation base 97 at a position U1. The two locking projections 118a and 118b of the tray locking arm 118 and the projection 71 of the tray 14 serve as a tray locking device 160 which locks the tray 14 at the disk-inserted position P2.

Next, a description will be given of the operations of the CD-ROM apparatus 10 of the present embodiment.

The CD-ROM apparatus 10 performs the disk loading operation so that the CD-ROM 26 is loaded into the main body 25 of the CD-ROM apparatus, and performs the disk ejecting operation so that the CD-ROM 26 is ejected from the main body 25. First, the disk loading operation of the CD-ROM apparatus 10 will be explained.

FIG. 8A shows the ejection condition of the CD-ROM apparatus 10. In the ejection condition, the slider 100 is moved in the direction X2 to a slid position. The rotation base 97 is located at the position U1, shown in FIG. 7, which is the first position of the rotation base 97.

Figure 10:
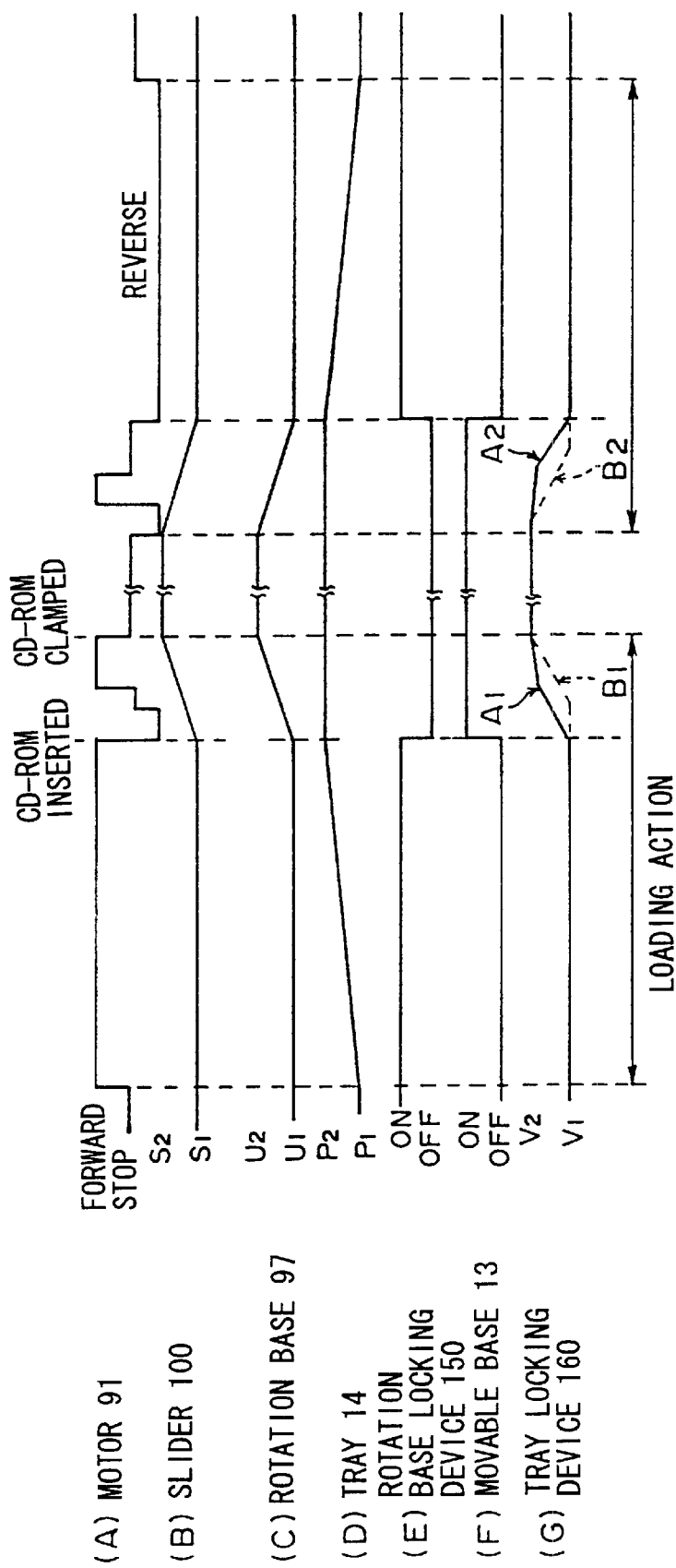
FIG. 10 is a time chart for explaining operations of the CD-ROM apparatus of FIG. 1 when the disk loading and ejecting operations are performed.
Figure 11:
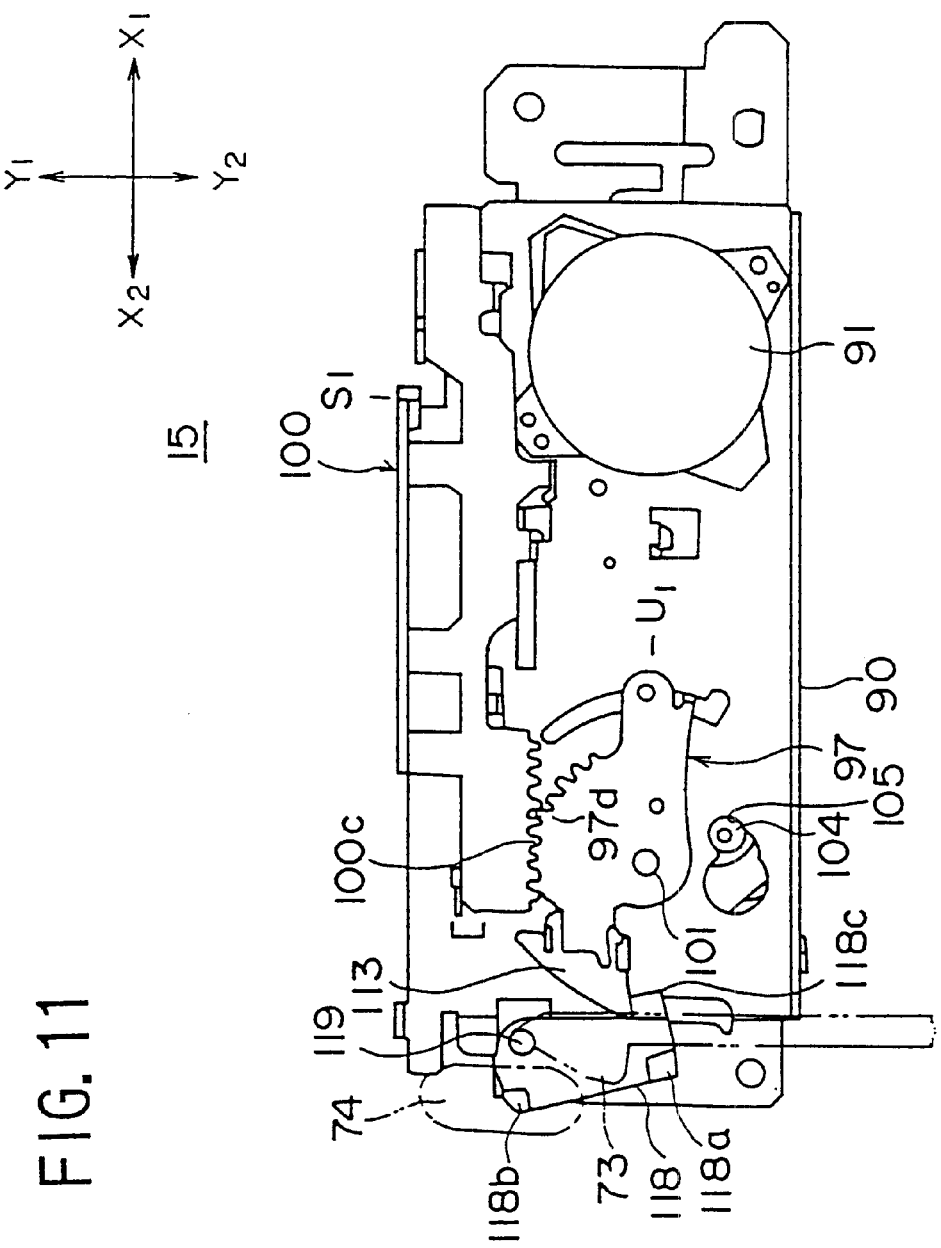
FIG. 11 is a diagram showing a condition of the loading drive device in the CD-ROM apparatus of FIG. 1 before a start of the disk loading operation.
Figure 12:
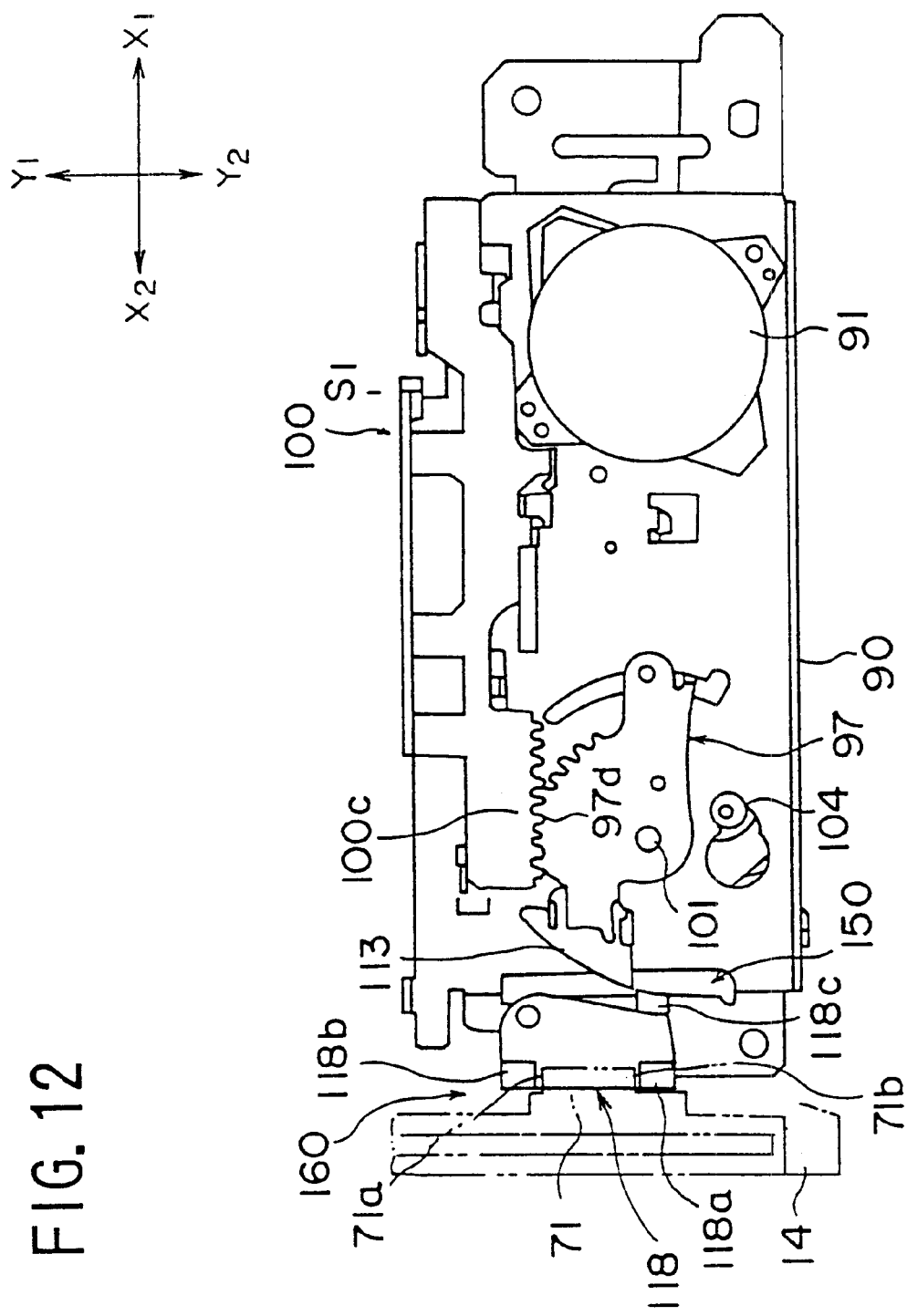
FIG. 12 is a diagram showing a condition of the loading drive device when the tray is moved to the disk inserted position.

Further, as shown in FIG. 11, the arm guide 113 is locked by the locking projection 118c of the tray locking arm 118. The rotation base locking device 150 is set in ON state (see the time chart indicated by (E) in FIG. 10). The rotation base 97 is locked at the position U1, and the counterclockwise rotation of the rotation base 97 is restricted. The tray 14 is located at the disk-change position P1, and the CD-ROM placing portion 60 of the tray 14 is exposed in the outside of the main body 25. In the ejection condition of the CD-ROM apparatus 10, the operator can place the CD-ROM 26 on or remove the CD-ROM 26 from the CD-ROM placing portion 60 of the tray 14.

Further, in the ejection condition of the CD-ROM apparatus 10, the tray locking device 160 is set in OFF state, and the tray 14 is set in a movable condition in which the tray 14 is movable in the direction Y1. The movable base 13 is located at the lowered position V1 where the movable base 13 is downwardly slanted.

When the CD-ROM apparatus 10 is in the ejection condition, the operator either depresses the control button 143 or perform the manual operation to push the tray 14 toward the main body 25 of the CD-ROM apparatus. This allows the disk loading operation of the CD-ROM apparatus 10 to start. At the start of the disk loading operation, the loading motor 91 is actuated in the forward direction to move the tray 14 toward the main body 25. The rotation of the motor 91 is transmitted in order of the belt 117, the pulley 102, the gear 93, the gear 94, the gear 95 and the gear 96, while the speed of the rotation is gradually reduced. The gear 96 is rotated clockwise. The rotation base 97 is set in the locked condition, and the rotation base 97 remains at the position U1.

The rotation of the gear 96 causes the rack 70 of the tray 14 to be moved through the engagement of the gear 96 and the rack 70. The movement of the tray 14 in the direction Y1 is started from the disk-change position P1, as indicated by (D) in FIG. 10. When the gear 96 is rotated about 1.3 revolutions, the tray 14 reaches the disk-inserted position P2, and the CD-ROM 26 will be loaded into the main body 25 of the CD-ROM apparatus.

When the tray 14 is moved from the position immediately preceding the disk-inserted position P2 to the disk-inserted position P2, the following two actions are carried out.

The first action is that the projection 71 of the tray 14 contacts the portion 118b of the tray locking arm 118, the tray 14 pushes the tray locking arm 118 through the movement, and the tray locking arm 118 is rotated clockwise. The projection 118c of the tray locking arm 118 is disconnected from the arm guide 113. The rotation base locking device 150 is set in OFF state as in the time chart indicated by (E) in FIG. 10.

The second action is that the locking projection 118a of the tray locking arm 118 is directed to the contact surface portion 71b of the tray 14 by the clockwise rotation of the tray locking arm 118 . The projection 71 of the tray 14 is interposed between the locking projections 118a and 118b of the tray locking arm 118. The tray locking device 160 is set in ON state as in the time chart indicated by (E) in FIG. 10.

When the rotation base locking device 150 is set in OFF state, the rotation base 97 is able to be rotated counterclockwise. When the tray locking device 150 is set in ON state, the movements of the tray 14 in the directions Y1 and Y2 are restricted, and the gear 96 is no more rotated.

Figure 13:
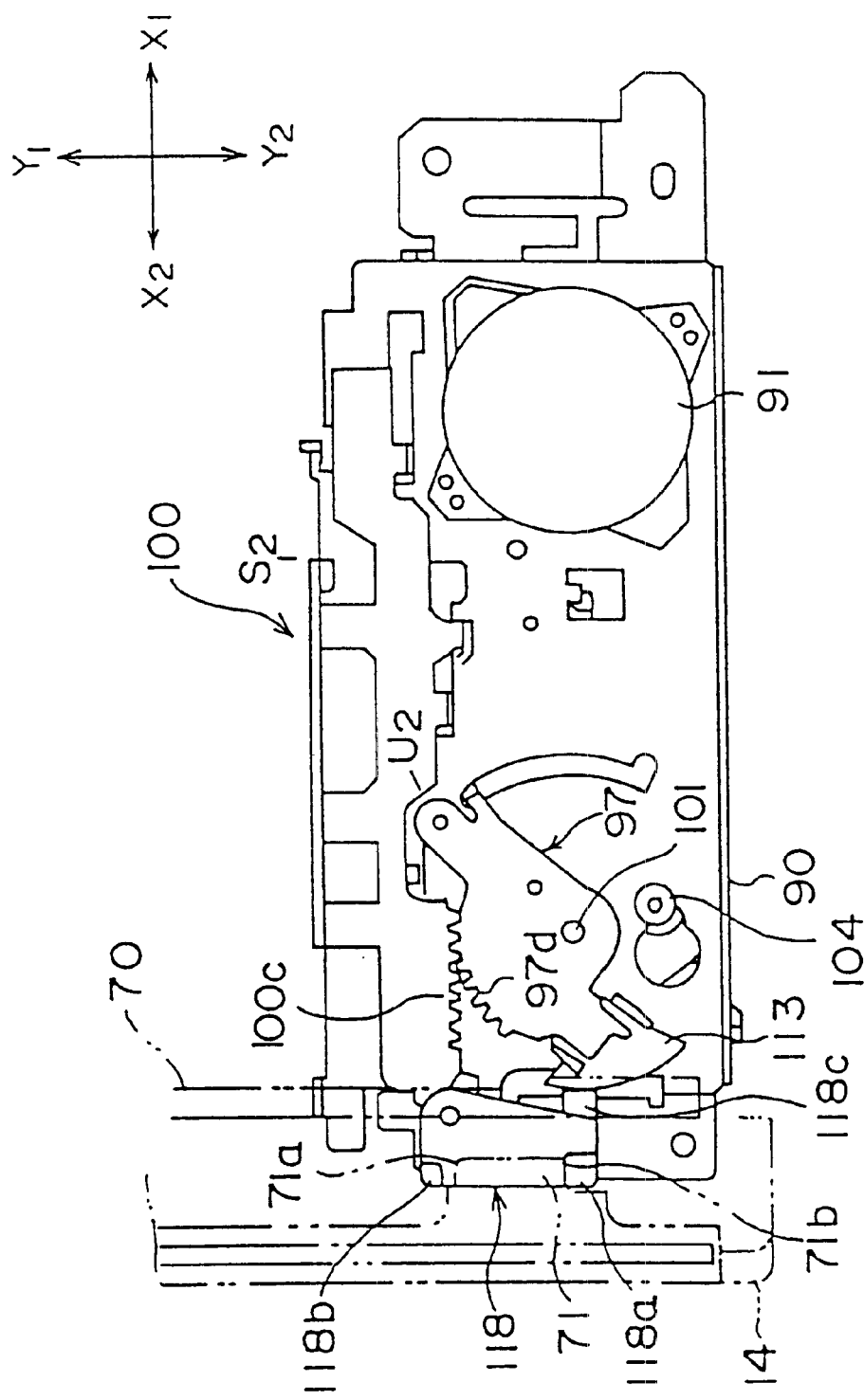
FIG. 13 is a diagram showing a condition of the loading drive device when the rotation base is rotated after the tray reaches the disk inserted position.

Even after the above actions are performed, the motor 91 continues to be rotated in the forward direction. This causes the gear 95 to be rotated around the outer periphery of the gear 96. The rotation base 97 is rotated counterclockwise as shown in FIG. 13. The rotation base 97 is rotatable within the range of the circular slit 109, and the rotation base 97 is, as in the time chart indicated by (C) in FIG. 10, rotated counterclockwise to a position U2, which is the second position of the rotation base 97.

As the rotation base 97 is rotated counterclockwise to the position U2, the rack 100c of the slider 100 is actuated by the engagement of the gear portion 97d and the rack 100c. The slider 100 is, as shown in FIG. 13 and in the time chart indicated by (B) in FIG. 10, moved in the direction X1.

When the slider 100 is moved in the direction X1, the cam groove 182 upwardly moves the pin 57 and the movable base 13 is, as in the time chart indicated by (G) in FIG. 10, rotated in the direction A (in which the movable base 13 approaches the rack 14). This action will now be described in greater detail.

When the cam groove 182 is moved in the direction X1 together with the movement of the slider 100, the pin 57, which is fitted into the cam groove 182, is moved along the line of the cam groove 182. In this case, the contact between the pin 57 and the cam groove 182 is transferrred in the direction X1 from the start-point portion 182a to the end-point portion 182b. As previously described with reference to FIG. 4A and FIG. 4B, the cam groove 182 in the present embodiment is configured to have the grooves 182c and 182d with the small inclination angles θ1 and θ2 to the horizontal direction. The improved configuration of the cam groove 182 can provide a smooth and gradual movement of the pin 57.

Further, the cam groove 182 in the present embodiment is configured to have the horizontal length L1 (the distance from the start-point portion 182a to the end-point portion 182b) that is larger than the horizontal length L0 of the cam groove 200 in the conventional disk apparatus. At the same time, the cam groove 182 in the present embodiment has the inclination angles θ1 and θ2 that are smaller than the inclination angle θ0 of the cam groove 200 in the conventional disk apparatus (θ1<θ0, θ2<θ0).

The improved configuration of the cam groove 182 can provide a smooth and gradual movement of the movable base 13. A description will be given of this matter with reference to the time chart indicated by (G) in FIG. 10.

In the time chart indicated by (G) in FIG. 10, the arrow A1 denotes the movement of the movable base 13 when the cam groove 182 of the present embodiment is used, and the arrow B1 denotes the movement of the movable base 13 when the cam groove 200 of the conventional disk apparatus is used. As shown, in the case of the cam groove 200, the movable base 13 must be moved more rapidly than in the case of the cam groove 182. The moving speed of the movable base 13 is relatively high. As the cam groove 182 has the improved configuration described above, the cam groove 182 can provide a smooth and gradual movement of the movable base 13. The moving speed of the movable base 13 is relatively low.

Accordingly, the turntable 20 on the movable base 13 can be slowly connected to the CD-ROM 26 on the tray 14, and the CD-ROM 26 can be safely and reliably placed onto the turntable 20. The disk apparatus of the present embodiment is effective in performing safe and reliable disk loading operation.

During the above movement, the movable base-13 is upwardly rotated to the horizontal position V2 (where the pin 57 reaches the end-point portion 182b). Before the movable base 13 reaches the position V2, the turntable 20 on the movable base 13 is connected to the CD-ROM 26, and the CD-ROM 26 is slightly lifted from the CD-ROM placing portion 60 of the tray 14 by the turntable 20.

With the above movement of the movable base 13, the turntable 20 on the movable base 13 is located near the clamper 16. The magnet 20a provided in the turntable 20 exerts an attracting force on the clamper 16 so as to connect the turntable 20 and the clamper 16 together. The CD-ROM 26 on the turntable 20 is held by the clamper 16 using the connection by the attracting force of the magnet 20a. In this condition, the CD-ROM 26 is clamped between the clamper 16 and the turntable 20.

In the disk apparatus shown in FIG. 1, a movable-base position sensing switch 169 is provided to detect a position of the movable base 13 during the disk loading and ejecting operations. The position sensing switch 169 in the present embodiment is configured so that the position sensing switch 169 is turned from OFF state into ON state when the CD-ROM 26 on the turntable 20 is clamped by the clamper 16. When the position sensing switch 169 is turned into ON state, the rotation of the motor 91 is stopped as in the time chart indicated by (A) in FIG. 10. The disk loading operation of the disk apparatus for the CD-ROM 26 is carried out in this manner. Following the end of the disk loading operation, the motor 21 starts the rotation of the turntable 20, and while the CD-ROM 26 on the turntable 20 is rotated by the motor 21, the disk reproducing operation for the CD-ROM 26 is performed by using the optical head 22.

As shown in FIG. 5, an upwardly extending positioning projection 180 is provided at a predetermined position on the top of the movable base body 19 of the movable base 13. The positioning opening 181 is provided in the surface of the tray 14. During the disk loading operation, the positioning projection 180 and the positioning opening 181 are connected together when the tray 14 is located at the disk-inserted position P2 and the movable base 13 is located at a predetermined position where the turntable 20 and the clamper 16 are connected together.

By the above connection of the positioning projection 180 and the positioning opening 181, it is possible for the disk apparatus of the present embodiment to provide accurate positioning of the tray 14 and the movable base 13.

As previously described, the turntable 20 is provided on the movable base 13 in order to rotate the CD-ROM 26 on the turntable 20. Hence, the disk apparatus of the present embodiment is effective in providing accurate positioning of the tray 14 and the turntable 20 when the CD-ROM 26 is placed onto the turntable 20 during the disk loading operation. The CD-ROM 26 on the tray 14 can be positioned onto the turntable 20 on the movable base 13 with high accuracy, and the disk apparatus of the present embodiment is effective in providing good disk reproducing operation of the CD-ROM 26.

Figure 14:
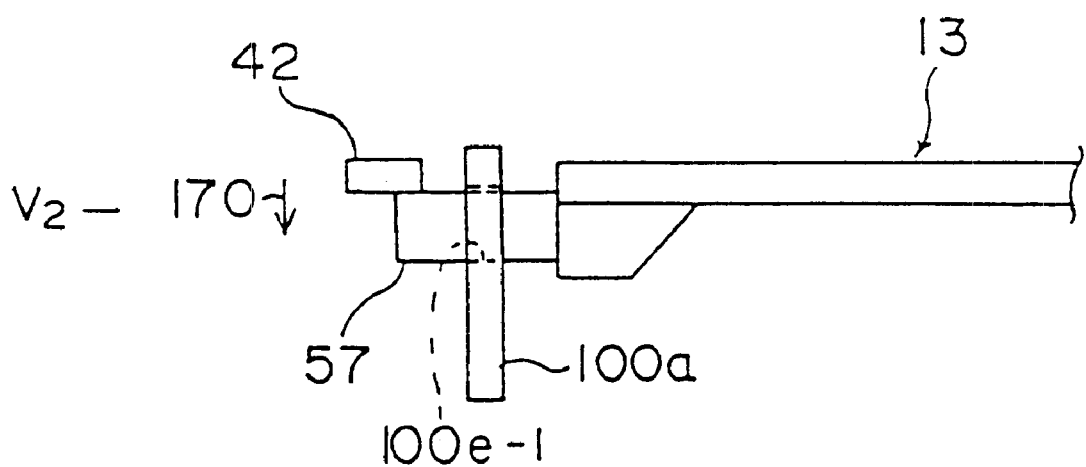
FIG. 14 is a diagram showing a condition of the loading drive device when the movable base is rotated to the horizontal position.

When the movable base 13 is upwardly rotated to the horizontal position V2, the pin 57 of the movable base 13 is, as shown in FIG. 14, connected to the leaf spring 42. As indicated by the arrow 170 in FIG. 14, the leaf spring 42 exerts a downward actuating force on the pin 57 so as to press the pin 57 in the downward direction. This may produce no redundant space between the pin 57 and the end-point portion 182*b* of the cam groove 182. The movable base 13 in this condition is firmly connected to the base 12 without play between the pin 57 and the cam groove 182, which will provide stable disk reproducing operation of the CD-ROM 26 on the disk apparatus.

Next, the disk ejecting operation of the CD-ROM apparatus 10 of the present embodiment will be explained. In the disk ejecting operation, the CD-ROM 26 is unloaded from the main body of the disk apparatus. The disk ejecting operation is basically performed by actuating the loading motor 91 in the reverse direction. During the disk ejecting operation, the elements of the disk apparatus carry out the reversed operation with respect to the disk loading operation.

Specifically, the disk ejecting operation of the CD-ROM apparatus 10 includes the following actions.

(1) The rotation base 97 is rotated clockwise, the slider 100 is moved in the direction X2, and the movable base 13 is downwardly rotated to the position V1. By this action, the CD-ROM 26 on the turntable 20 is unclamped from the clamper 16, and placed onto the tray 16.

Figure 15:
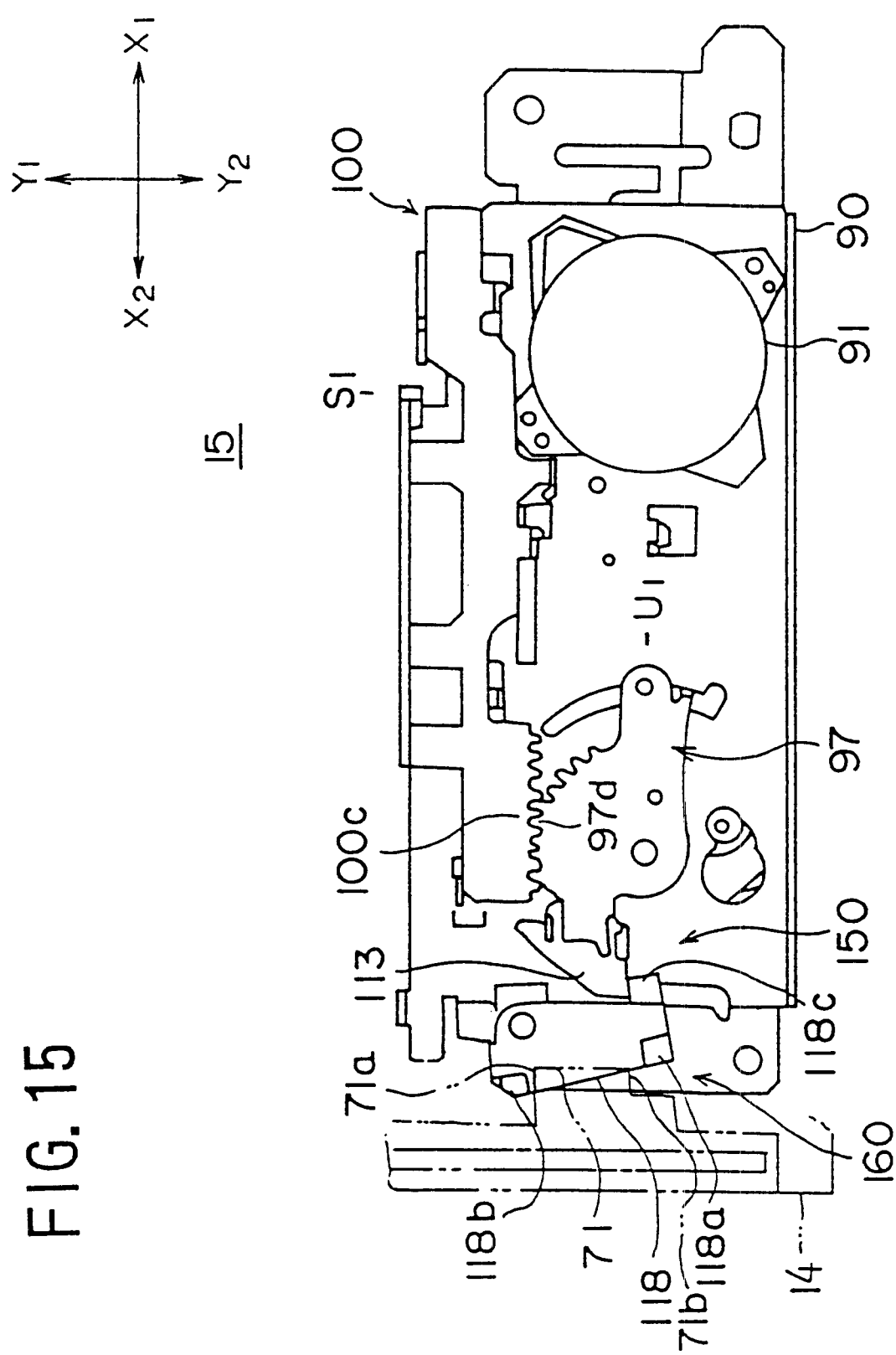
FIG. 15 is a diagram showing a condition of the loading drive device just after a start of the disk ejecting operation.

(2) When the rotation base 97 is rotated to the position U1, the tray locking arm 118 is, as shown in FIG. 15, rotated counterclockwise. The movable base locking device 150 is set in ON state, and the tray locking device 160 is set in OFF state.

(3) The tray 14 is moved in the direction Y2 to the disk-change position P1.

With the movement of the tray 14, the CD-ROM 26 on the tray 14 is ejected out of the main body 25 of the disk apparatus. When the tray 14 is moved to the disk-change position P1, a projection 68 is brought into contact with a switch 171, and the switch 171 is turned into ON state. The rotation of the motor 91 is stopped when the switch 171 is set in ON state. Further, as shown in FIG. 11, the connecting portion 73 of the tray 14 is connected to the locking projection 118*b* of the tray locking arm 118, and the separation of the tray 14 from the tray locking arm 118 is avoided by this connection.

The operation of the movable base 13 during the disk ejecting operation will be explained.

As previously described, during the disk reproducing operation of the CD-ROM 26, the CD-ROM 26 is placed on the turntable 20 and slightly lifted from the tray 14. At a start of the disk ejecting operation, the CD-ROM 26 on the turntable 20 is placed onto the tray 14. This movement of the CD-ROM 26 from the turntable 20 to the tray 14 is performed as follows.

First, the motor 91 is rotated in the reverse direction, and the slider 100 is moved in the direction X2. By the movement of the slider 100, the cam groove 182 causes the pin 57 to be downwardly moved. The movable base 13 is downwardly rotated in the direction B (in which the movable base 13 moves away from the tray 14) as in the time chart indicated by (G) in FIG. 10. By the movement of the cam groove 182 in the direction X2, the pin 57, which is fitted into the cam groove 182, is moved along the line of the cam groove 182. In this case, the contact between the pin 57 and the cam groove 182 is transferred in the direction X2 from the end-point portion 182*b* to the start-point portion 182*a*.

As previously described, the cam groove 182 in the present embodiment is configured to have the grooves 182*c* and 182*d* with the small inclination angles θ1 and θ2 to the horizontal direction. The improved configuration of the cam groove 182 can provide a smooth and gradual movement of the pin 57. Further, the cam groove 182 in the present embodiment is configured to have the horizontal length L1 (the distance from the start-point portion 182*a* to the end-point portion 182*b*) that is larger than the horizontal length L0 of the cam groove 200 in the conventional disk apparatus.

The improved configuration of the cam groove 182 can provide a smooth and gradual movement of the movable base 13. A description will be given of this matter with reference to the time chart indicated by (G) in FIG. 10.

In the time chart indicated by (G) in FIG. 10, the arrow A2 denotes the movement of the movable base 13 when the cam groove 182 of the present embodiment is used, and the arrow B2 denotes the movement of the movable base 13 when the cam groove 200 of the conventional disk apparatus is used. As shown, in the case of the cam groove 200, the movable base 13 must be moved more rapidly than in the case of the cam groove 182. The moving speed of the movable base 13 is relatively high. As the cam groove 182 has the improved configuration described above, the cam groove 182 can provide a smooth and gradual movement of the movable base 13. The moving speed of the movable base 13 is relatively low.

Accordingly, the unclamping operation of the CD-ROM 26 between the clamper 16 and the turntable 20 against the attracting force of the magnet 20*a* can be smoothly performed. Even after the CD-ROM 26 is unclamped from the clamper 16, the CD-ROM 26 on the turntable 20 can be slowly placed onto the tray 14. The disk apparatus of the present embodiment is effective in performing safe and reliable disk ejecting operation. Further, the CD-ROM 26 can be safely placed onto the tray 14 with high accuracy, and the disk apparatus of the present embodiment is effective in preventing the damaging the CD-ROM 26 or the elements of the disk apparatus during the disk ejecting operation.

Next, a description will be given of another preferred embodiment of the disk apparatus of the present invention.

In the previously described embodiment, in order to slowly place the CD-ROM 26 onto the turntable 20, the improved mechanical configuration of the cam groove 182 with the grooves 182*c* and 182*d* is used to reduce the moving speed of the turntable 20 and provide a smooth, gradual movement of the movable base 13.

Figure 17:
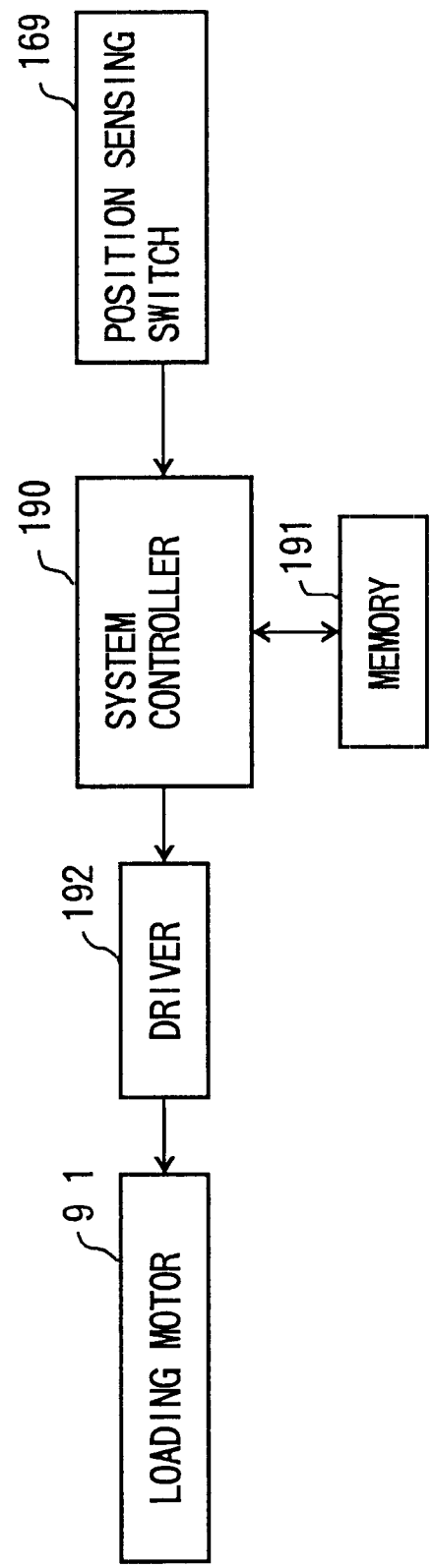
FIG. 17 is a block diagram of a CD-ROM apparatus of another preferred embodiment of the invention.

In the present embodiment, as shown in FIG. 17, the rotation of the loading motor 91 is controlled by a system controller (CPU) 190 so as to achieve the objects of the invention that are the same as those in the previous embodiment. Hereinafter, this control will be called the motor control. In the following descriptions, the elements of the disk apparatus of the present embodiment which are essentially the same as corresponding elements in the previous embodiment are designated by the same reference numerals, and a description thereof will be omitted.

Unless otherwise described, in the disk apparatus of the present embodiment, the first positioning portion 180 and the second positioning portion 181 are respectively provided on the movable base and the tray in a manner similar to that of the previous embodiment. With this configuration, the disk apparatus of the present embodiment can achieve the advantages and effects that are essentially the same as those of the previous embodiment.

FIG. 17 is a system block diagram of a CD-ROM apparatus of the present embodiment. As shown in FIG. 17, the CD-ROM apparatus of the present embodiment generally comprises the loading motor 91, a driver 191, the system controller 190, a memory 191, and the movable-base position sensing switch 169. The position sensing switch 169 supplies the position-related information of the movable base 13 (or, the position-related information of the turntable 20) to the system controller 190. The system controller 190 is connected to the memory 191. Control programs, which are provided to execute a loading control process and an ejecting control process on the CD-ROM apparatus (which will be described later), are stored in the memory 191. Further, the driver 192 connects the loading motor 91 and the system controller 190, and the system controller 190 controls the rotation of the motor 91 through the driver 192.

In the present embodiment, the position sensing switch 169 is provided in the CD-ROM apparatus such that the position sensing switch 169 is turned from ON state into OFF state at a time the turntable 20 of the movable base 13 is separated from the clamper 16 at an unclamped position during the downward movement of the movable base 14 to the unclamped position.

FIG. 21A, FIG. 21B and FIG. 21C show changes of the motor voltage, the turntable height and the position sensing switch 169 in the disk ejecting operation of the CD-ROM apparatus of the present embodiment. FIG. 23A, FIG. 23B and FIG. 23C show changes of the motor voltage, the turntable height and the position sensing switch in a disk ejecting operation of a conventional disk apparatus.

As shown in FIG. 21A, FIG. 21B and FIG. 21C, the position sensing switch 169 in the present embodiment is turned from ON state to OFF state at a time the turntable height is reduced to the unclamped position during the downward movement of the movable base 13. The turntable height means a position of the turntable 20 of the movable base 13 within the CD-ROM apparatus, which is equivalent to the position of the movable base 13 in the CD-ROM apparatus. When the position sensing switch 169 is set in OFF state, the position sensing switch 169 outputs a signal, indicating that the movable base 13 reaches the unclamped position, to the system controller 190. By receiving the output signal from the position sensing switch 169, the system controller 1 can safely detect when the movable base 13 has reached the unclamped position during the disk ejecting operation.

However, as shown in FIG. 23A, FIG. 23B and FIG. 23C, it is difficult for the conventional disk apparatus to safely detect when the movable base 13 reaches the unclamped position during the disk ejecting operation, unless the position sensing switch 169 of the present embodiment is provided there.

Next, the disk loading operation of the CD-ROM apparatus of the present embodiment will be explained.

Figure 18:
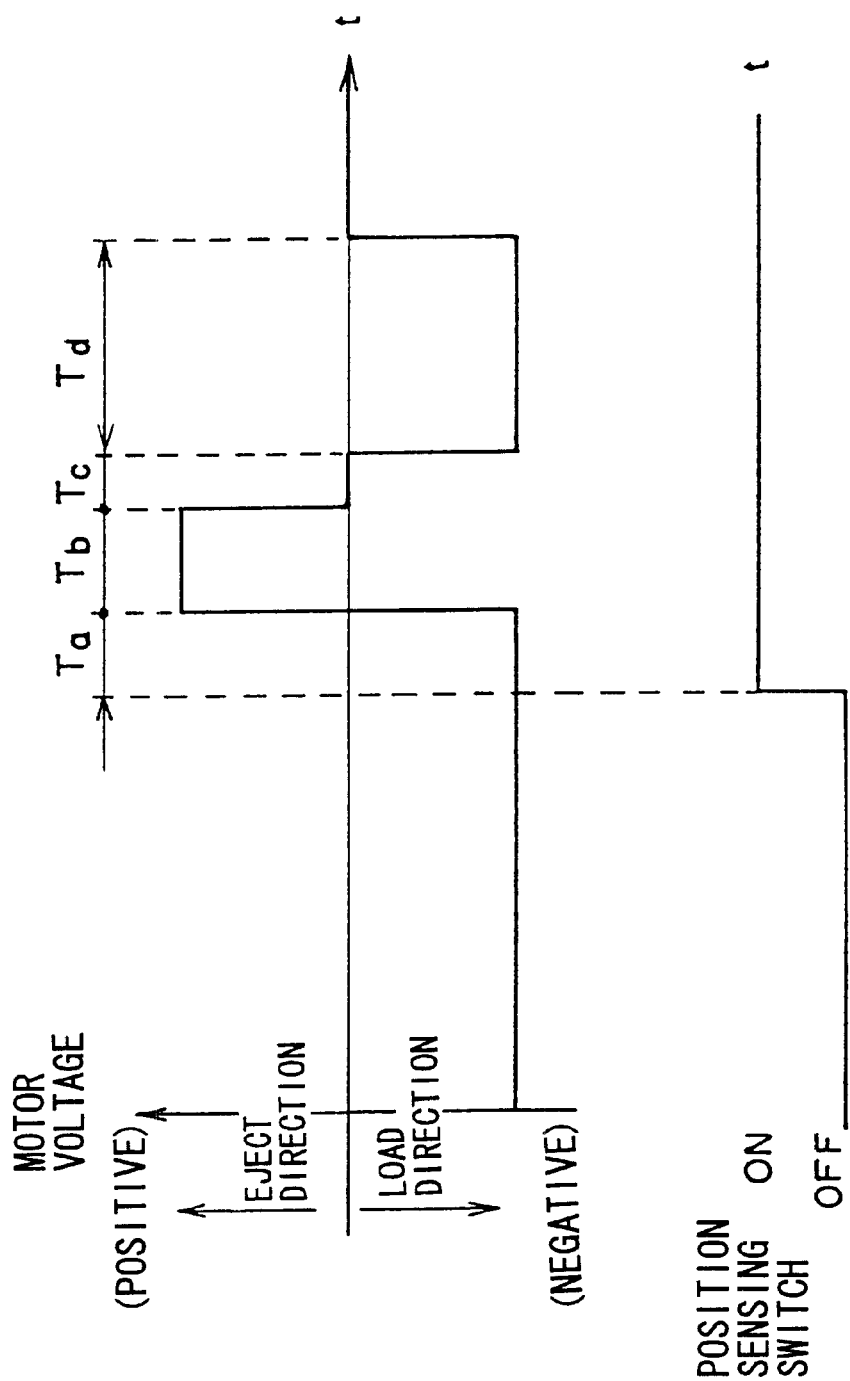
FIG. 18A and FIG. 18B are time charts for explaining a successful disk loading operation of the CD-ROM apparatus of the present embodiment.
Figure 19:
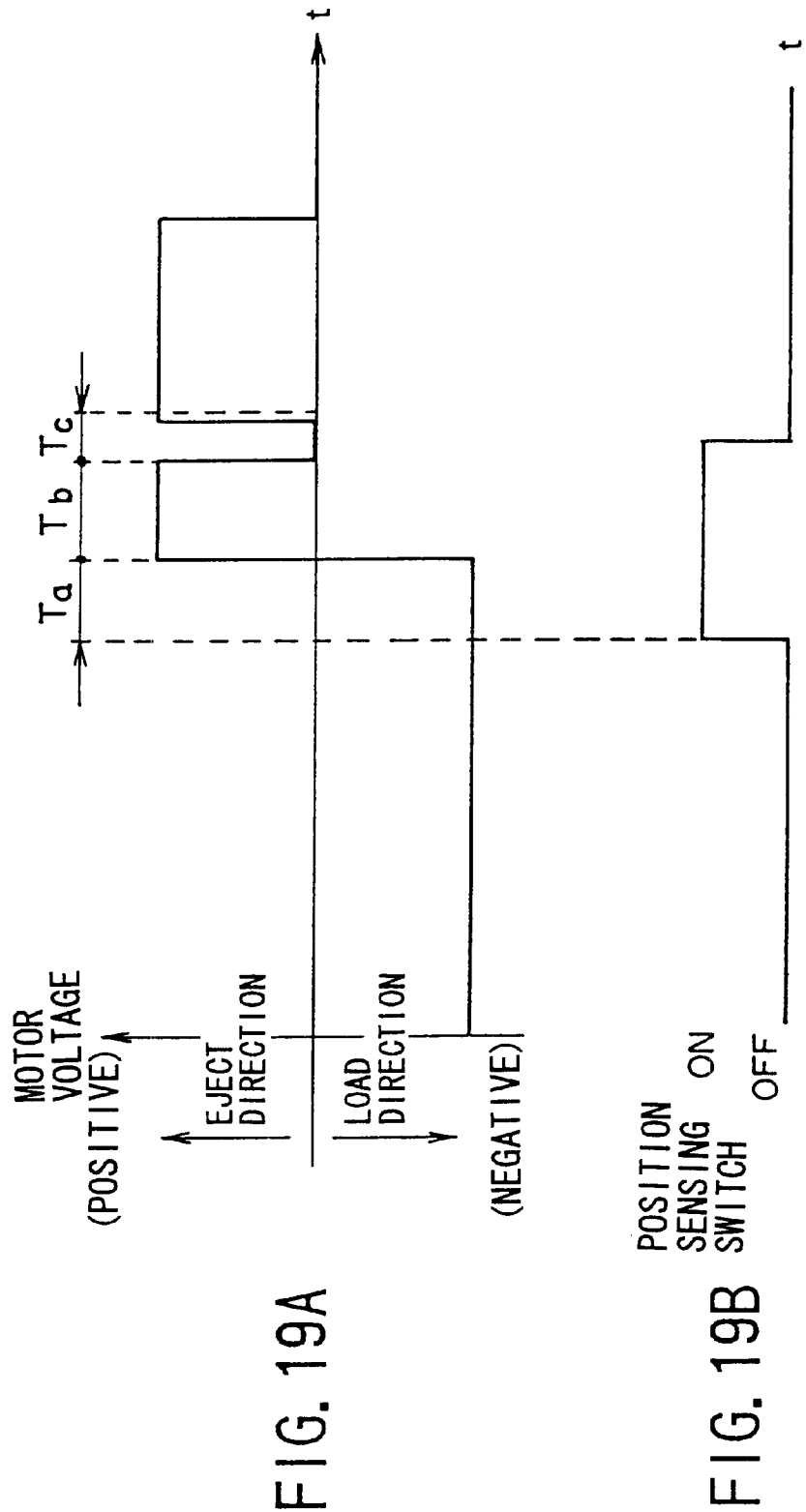
FIG. 19A and FIG. 19B are time charts for explaining a faulty disk loading operation of the CD-ROM apparatus of the present embodiment.

FIG. 18A and FIG. 18B show a successful disk loading operation of the CD-ROM apparatus of the present embodiment. FIG. 19A and FIG. 19B show a faulty disk loading operation of the CD-ROM apparatus of the present embodiment caused by the inclusion of a foreign matter.

Figure 20:
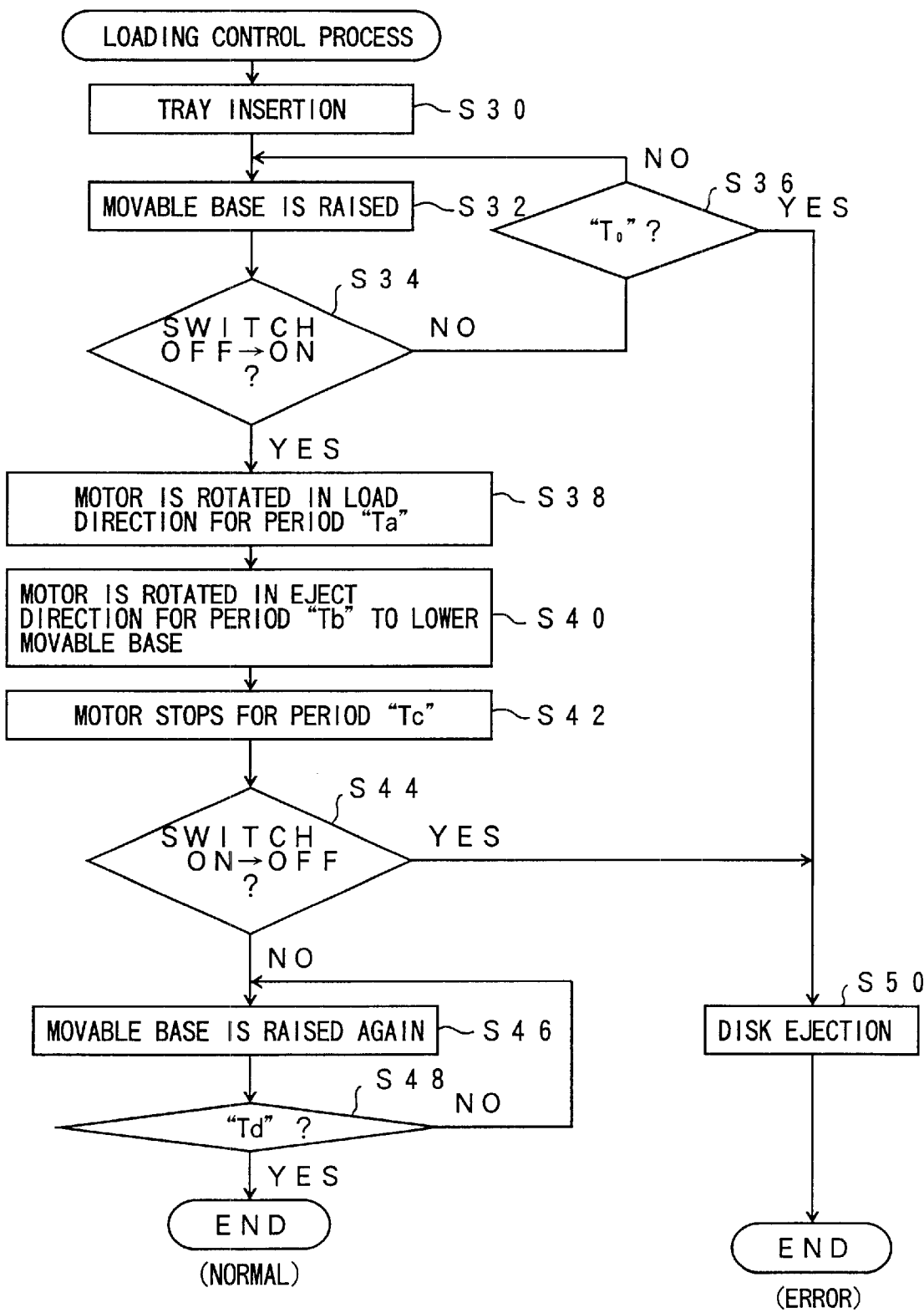
FIG. 20 is a flowchart for explaining a loading control process executed by the CD-ROM apparatus of the present embodiment.

When the operator depresses the control button 143 with the CD-ROM 26 being placed on the tray 14 or performs a manual operation to push the tray 14 toward the main body of the CD-ROM apparatus, the system controller 190 starts execution of the loading control process which is stored in the memory 191 and loaded to the system controller 190. FIG. 20 shows the loading control process executed by the CD-ROM apparatus of the present embodiment.

As shown in FIG. 20, at a start of the loading control process, the system controller 190 at step S30 actuates the loading motor 91 to insert the tray 14 into the main body 25 of the CD-ROM apparatus, which is similar to that in the previous embodiment.

After the tray 14 is moved to the disk-inserted position within the main body 25, the system controller 190 at step S32 actuates the motor 91 to upwardly rotate the movable base 13. The upward movement of the movable base 13 is continued by the system controller 190 until it is detected that the position sensing switch 169 is turned from OFF state to ON state (step S42).

In a case of the inclusion of the foreign matter in the tray 16, the foreign matter is detrimental to the upward movement of the movable base 13. The movable base 13 may not be upwardly rotated to the clamping position where the CD-ROM 26 on the turntable 20 is clamped by the clamper 16. In this condition, the position sensing switch 169 remains in OFF state and is not turned into ON state.

The system controller 190 at step S36 determines whether a predetermined period To has elapsed since the start of the upward movement of the movable base 13. When the period of the upward movement of the movable base 13 exceeds the period To, it is determined that the disk loading operation has failed due to the inclusion of the foreign matter. In this case, the system controller 190 at step S50 actuates the motor 91 in the reverse direction to perform the disk ejecting operation on the CD-ROM apparatus. After the step S50 is performed, the loading control process is terminated, and the system controller 190 provides warning information indicating an error in the loading control process.

It is possible for the disk apparatus of the present embodiment to prevent the damaging of the clamper 16, the turntable 20 and the optical head 22 due to the inclusion of the foreign matter in the tray 14.

On the other hand, when the result at the step S34 is affirmative, the system controller 190 controls the rotation of the loading motor 91 by using a time control.

When the result at the step S34 is affirmative, the system controller 190 at step S38 actuates the motor 91 in the loading direction for a first period "Ta" to upwardly rotate the movable base 13 to the clamping position. The movable base 13 is upwardly rotated to the horizontal clamping position where the CD-ROM 26 on the turntable 20 is held by the clamper 16.

After the step S38 is performed, the system controller 190 at step S40 actuates the motor in the ejecting direction (which is opposite to the loading direction) for a second period "Tb" from the end of the first period Ta. The moving speed of the movable base 13 during the disk loading operation is reduced by the actuation of the motor 91 in the reverse direction. After the step S40 is performed, the system controller 190 at step S42 stops the rotation of the motor 91 for a third period "Tc" from the end of the second period Tb.

The steps S40 and S42 are performed under the condition in which the position sensing switch 169 is set in ON state. In other words, the steps S40 and S42 are performed while the clamper 16 and the turntable 20 are connected together by the attracting force of the magnet 20a. However, even in the case of the inclusion of the foreign matter, the clamper 16 and the turntable 20 are connected together by the attracting force of the magnet 20a.

In the CD-ROM apparatus of the present embodiment, when the clamper 16 and the turntable 20 are connected together without foreign matter, the attracting force of the magnet 20a exerted between the turntable 20 and the clamper 16 is relatively large. The unclamping of the CD-ROM 26 from the clamper 16 hardly occurs. On the other hand, when the clamper 16 and the turntable 20 are connected together with the inclusion of the foreign matter, the attracting force of the magnet 20a is relatively small. The unclamping of the CD-ROM 26 from the clamper 16 is likely to occur. By receiving the output signal from the position sensing switch 169, it is possible for the system controller 190 to determine whether the unclamping has occurred after the steps S40 and S42 are performed.

After the step S42 is performed, the system controller 190 at step S44 determines whether the position sensing switch 169 is turned from ON state into OFF state. When the result at the step S44 is negative, the position sensing switch 169 remains in ON state as shown in FIG. 18B. It is determined that the disk loading operation is successful and the CD-ROM 26 is suitably loaded in the disk apparatus. In this case, the next steps S46 and S48 are executed by the system controller 190.

The system controller 190 at step S46 actuates the motor 91 so as to upwardly rotate the movable base 13. After the step S46 is performed, the system controller 190 at step S48 determines whether a fourth period "Td" has elapsed since the restart of the upward movement of the movable base 13. After the fourth period Td has elapsed, the loading control process is terminated.

When the result at the step S44 is affirmative, the position sensing switch 169 is turned from ON state into OFF state as shown in FIG. 19B. It is determined that the disk loading operation has failed and the CD-ROM 26 will be ejected out of the main body 25 of the disk apparatus. In this case, the control of the system controller 190 is transferred to the above step S50. In the step S50, the disk ejecting operation is performed on the CD-ROM apparatus. After the step S50 is performed, the loading control process is terminated, and the system controller 190 provides the warning information indicating an error in the loading control process.

Accordingly, it is possible for the disk apparatus of the present embodiment to prevent the damaging of the clamper 16, the turntable 20 and the optical head 22 due to the inclusion of the foreign matter in the tray 14.

Figure 21:
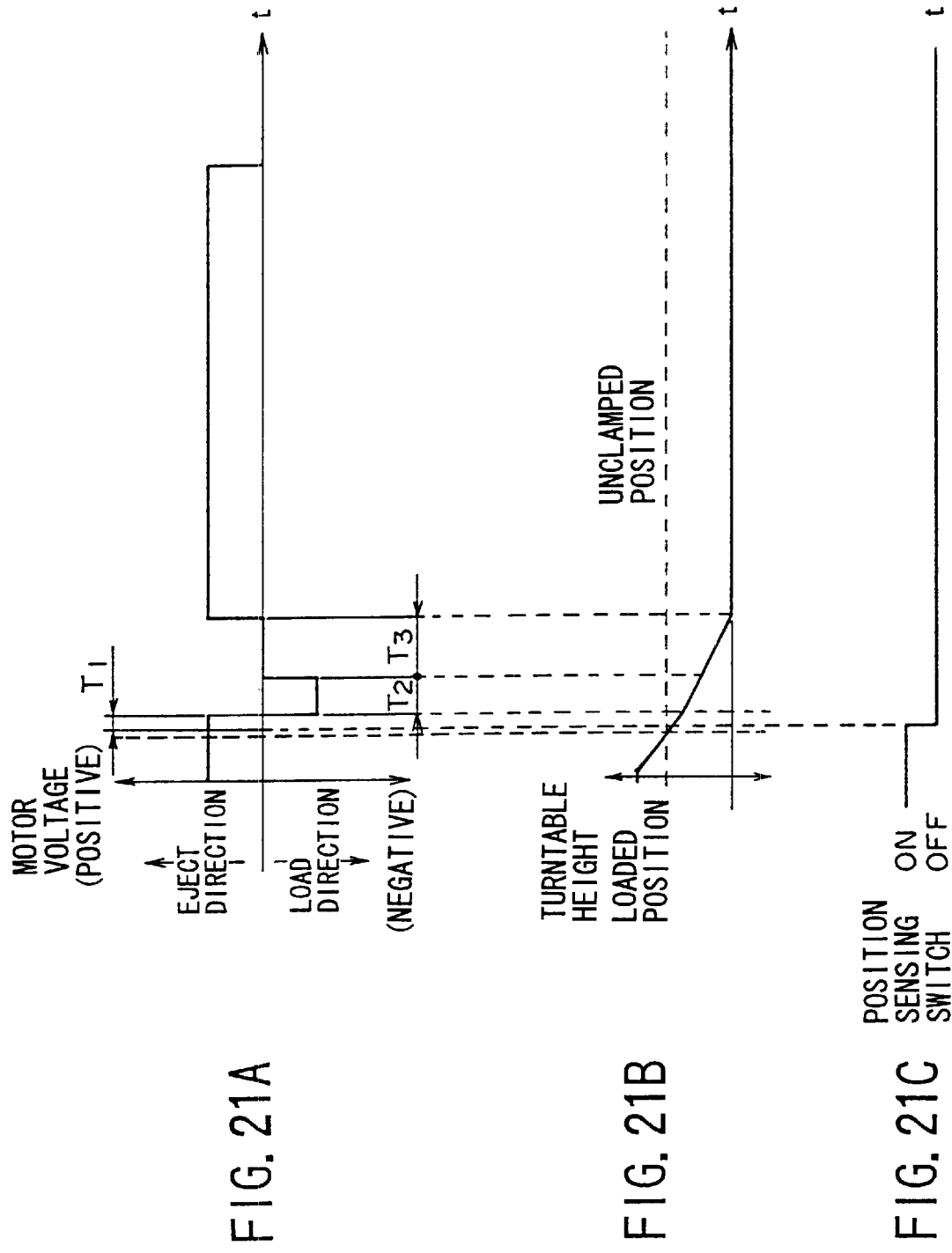
FIG. 21A, FIG. 21B and FIG. 21C are time charts for explaining the disk ejecting operation of the CD-ROM apparatus of the present embodiment.

Next, the disk ejecting operation of the CD-ROM apparatus of the present embodiment will be explained with reference to FIG. 21A through FIG. 22.

After the above-described disk loading operation is performed and the disk reproducing operation of the CD-ROM 26 is terminated, the operator depresses the control button 143. At this time, the system controller 190 starts execution of the ejection control process which is stored in the memory 191 and loaded to the system controller 190. FIG. 22 shows the ejection control process executed by the CD-ROM apparatus of the present embodiment.

Figure 22:
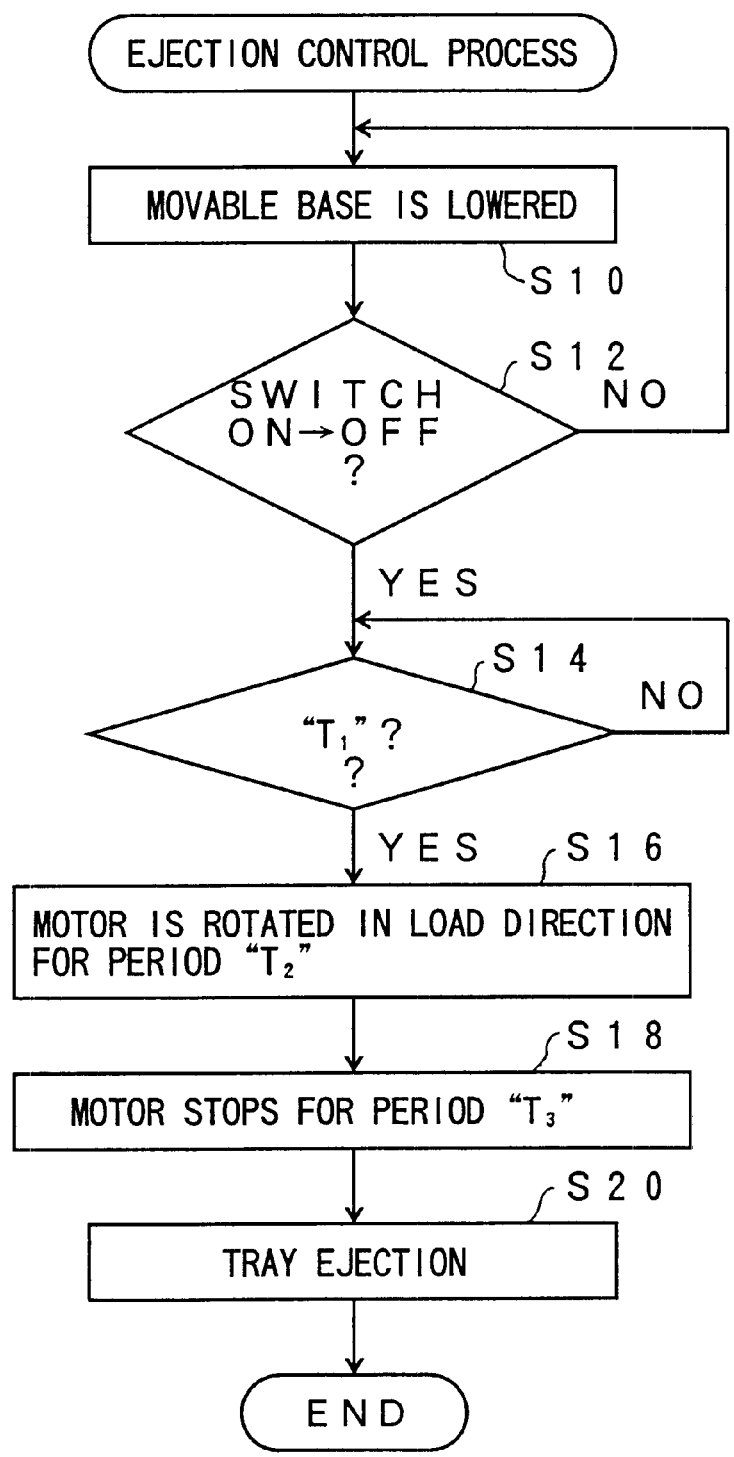
FIG. 22 is a flowchart for explaining an ejection control process executed by the CD-ROM apparatus of the present embodiment.

As shown in FIG. 22, at a start of the ejection control process, the system controller 190 at step S10 actuates the loading motor 91 in the ejecting direction to downwardly rotate the movable base 13 away from the tray 14. The downward movement of the movable base 13 is continued by the system controller 190 until it is detected that the position sensing switch 169 is turned from ON state into OFF state (step S12).

When the result at the step S12 is affirmative, the system controller 190 controls the rotation of the motor 91 by using a time control. The system controller 190 at step S14 determines whether a first period "T1" has elapsed since the detection of the OFF state of the position sensing switch 169. In the step S14, the motor 91 is continuously actuated in the ejecting direction to lower the movable base 13 to the unclamped position as indicated in FIG. 21A.

After the first period T1 has elapsed, the system controller 190 at step S16 actuates the motor 91 in the loading direction (which is opposite to the ejecting direction) for a second period "T2" as indicated in FIG. 21A. The rotation of the motor 91 in the reverse direction at this time causes the moving speed of the movable base 13 during the disk ejecting operation to be reduced.

After the step S16 is performed, the system controller 190 at step S18 stops the rotation of the motor 91 for a third period T3 from the end of the second period T2. The stopping motor 91 serves to brake the downward movement of the movable base 13. The moving speed of the movable base 13 is further reduced in the step S18.

After the third period T3 has elapsed, the system controller 190 at step S20 continuously actuates the motor 91 in the ejecting direction such that the tray 14 is ejected out of the main body 25 of the disk apparatus. After the step S20 is performed, the ejection control process of FIG. 22 is terminated.

In the above-described disk ejecting operation, the moving speed of the movable base 13 in the direction away from the tray 14 is suitable reduced. The braking force of the motor 91 acts on the movable base 13 so as to slowly place the CD-ROM 26 onto the tray 14. The rattling of the CD-ROM 26 within the tray 14 during the movement of the tray ejection can be avoided. Hence, the disk apparatus of the present embodiment is effective in carrying out safe and reliable disk ejecting operation of the disk loading mechanism.

Further, it is possible for the disk apparatus of the present embodiment to prevent the damaging of the clamper 16, the turntable 20 and the optical head 22 due to the inclusion of the foreign matter in the tray 14 during the disk loading and ejecting operations.

Further, the present invention is not limited to the above-described embodiments, and variations and modifications may be made without departing from the scope of the present invention.

What is claimed is:

1. A disk apparatus including
    a motor which provides a driving force,
    a tray which carries a disk from a disk-change position outside a main body of the disk apparatus to a disk-inserted position within the main body, the tray provided to be movable between the disk-change position and the disk-inserted position by using the driving force of the motor,
    a movable base which has a turntable for rotating the disk thereon and is provided to be movable relative to the tray between a clamping position where the disk on the turntable is held by a clamper and an unclamped position where the disk on the turntable is unclamped, and
    a drive device which moves up the movable base to the clamping position by using the driving force of the motor when the tray is at the disk-inserted position, and moves down the movable base from the clamping position to the unclamped position before the tray is moved toward the disk-change position,
    characterized in that said disk apparatus comprises:
        a movable-base position sensing switch (169) which is turned from ON state into OFF state at a time the turntable of the movable base is separated from the clamper during the movement of the movable base to the unclamped position; and control means (190, 191, S12–S20) for controlling the motor (91) so that the driving force of the motor is used to move the tray and/or to move the movable base through the drive device, the control means actuating the motor in a first direction to move the movable base to the unclamped position for a first period from the time the position sensing switch is turned into OFF state, actuating the motor in a reverse direction for a second period from an end of the first period, stopping the driving of the motor for a third period from an end of the second period, and actuating the motor in the first direction from an end of the third period such that the tray is moved to the disk-change position.

2. The disk apparatus according to claim 1, further comprising a driver which connects the motor and the control means, the control means controlling rotation of the motor through the driver.

3. A disk apparatus including a motor which provides a driving force, a tray which carries a disk from a disk-change position outside a main body of the disk apparatus to a disk-inserted position within the main body, the tray provided to be movable between the disk-change position and the disk-inserted position by using the driving force of the motor, a movable base which has a turntable for rotating the disk thereon and is provided to be movable relative to the tray between a clamping position where the disk on the turntable is held by a clamper and an unclamped position where the disk on the turntable is unclamped, and a drive device which moves up the movable base to the clamping position by using the driving force of the motor when the tray is at the disk-inserted position, and moves down the movable base from the clamping position to the unclamped position before the tray is moved toward the disk-change position, characterized in that said disk apparatus comprises:

a movable-base position sensing switch (169) which is turned from OFF state into ON state at a time the movable base is moved to reach a predetermined position during the movement of the movable base to the clamping position; and control means (190, 191, S38–S44, S50) for controlling the motor (91) so that the driving force of the motor is selectively used to move the tray or to move the movable base through the drive device, the control means actuating the motor in a first direction to move the movable base to the clamping position for a first period from the time the position sensing switch is turned into ON state, actuating the motor in a reverse direction for a second period from an end of the first period, and actuating the motor in the first direction when the position sensing switch is turned into OFF state during the second period, such that the tray is moved to the disk-change position.

4. The disk apparatus according to claim 2, wherein the control means (S42) controls the motor such that the control means stops the driving of the motor for a third period from an end of the second period.

5. The disk apparatus according to claim 2, wherein the control means (S46, S48) controls the motor such that the control means actuating the motor in the first direction for a fourth period when the position sensing switch remains in ON state, not turned into OFF state, during the second period, such that the movable base is moved up to the clamping position.

6. The disk apparatus according to claim 2, wherein the clamper is associated with a magnet (20a) provided in the turntable, and when the tray is at the disk-inserted position, the turntable and the clamper are connected to each other by an attracting force of the magnet so that the disk on the turntable is held by the clamper using the connection by the attracting force of the magnet.

* * * * *